(12) United States Patent
Sugiyama

(10) Patent No.: US 8,988,742 B2
(45) Date of Patent: Mar. 24, 2015

(54) IMAGE SENSOR UNIT, PAPER SHEET DISTINGUISHING APPARATUS, IMAGE READING APPARATUS AND IMAGE FORMING APPARATUS

(71) Applicant: Canon Components, Inc., Kodama-gun, Saitama (JP)

(72) Inventor: Takeshi Sugiyama, Saitama (JP)

(73) Assignee: Canon Components, Inc. (JP)

( * ) Notice: Subject to any disclaimer, the term of this patent is extended or adjusted under 35 U.S.C. 154(b) by 0 days.

(21) Appl. No.: 14/264,245

(22) Filed: Apr. 29, 2014

(65) Prior Publication Data

US 2014/0333974 A1    Nov. 13, 2014

(30) Foreign Application Priority Data

May 8, 2013   (JP) .................. 2013-098693

(51) Int. Cl.
*H04N 1/04* (2006.01)
*H04N 1/00* (2006.01)
*H04N 1/031* (2006.01)

(52) U.S. Cl.
CPC ......... *H04N 1/00557* (2013.01); *H04N 1/0314* (2013.01)
USPC ............ 358/474; 358/496; 358/497; 358/498

(58) Field of Classification Search
USPC .................. 358/474, 496, 497, 498
See application file for complete search history.

(56) References Cited

U.S. PATENT DOCUMENTS

| 2002/0167062 A1* | 11/2002 | Narita ............... 257/433 |
| 2005/0029612 A1* | 2/2005 | Nagasaka et al. ....... 257/432 |
| 2009/0159112 A1* | 6/2009 | Kushiya et al. ........ 136/244 |

FOREIGN PATENT DOCUMENTS

JP    2010-283436 A    12/2010

* cited by examiner

*Primary Examiner* — Houshang Safaipour
(74) *Attorney, Agent, or Firm* — Rossi, Kimms & McDowell LLP

(57) ABSTRACT

An image sensor unit includes a frame in which a light source and an image sensor are housed, and a cover member that is bonded to the frame. The cover member is bonded by means of a double-sided tape that includes a film-shaped substrate and adhesive layers formed on both sides of the substrate. Slits that extend from one outer edge in a width direction to an intermediate portion in the width direction and slits that extend from the other outer edge in the width direction to an intermediate portion in the width direction are formed in the double-sided tape. The respective slits that are adjacent include an overlapping portion when viewed in a long-side direction.

11 Claims, 22 Drawing Sheets

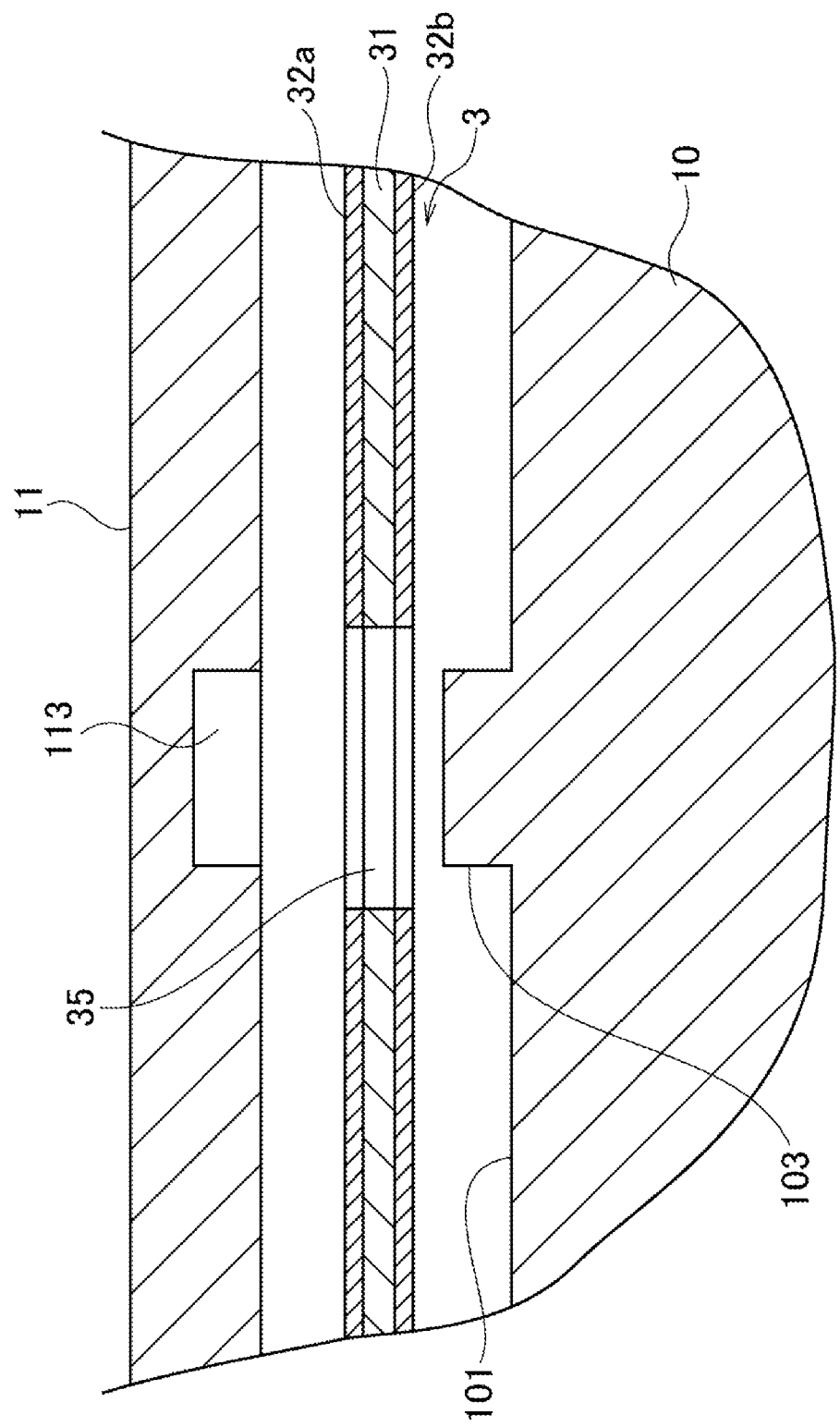

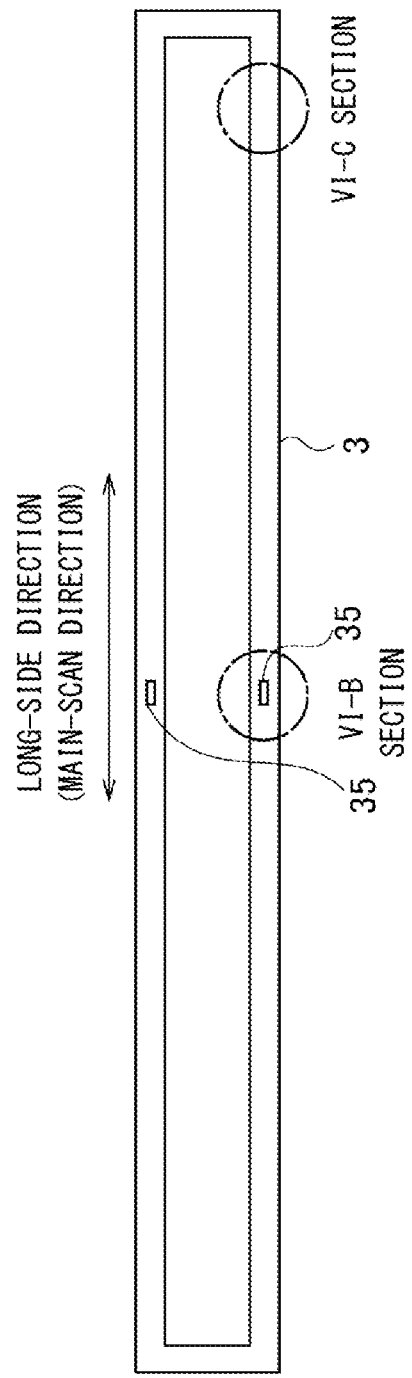

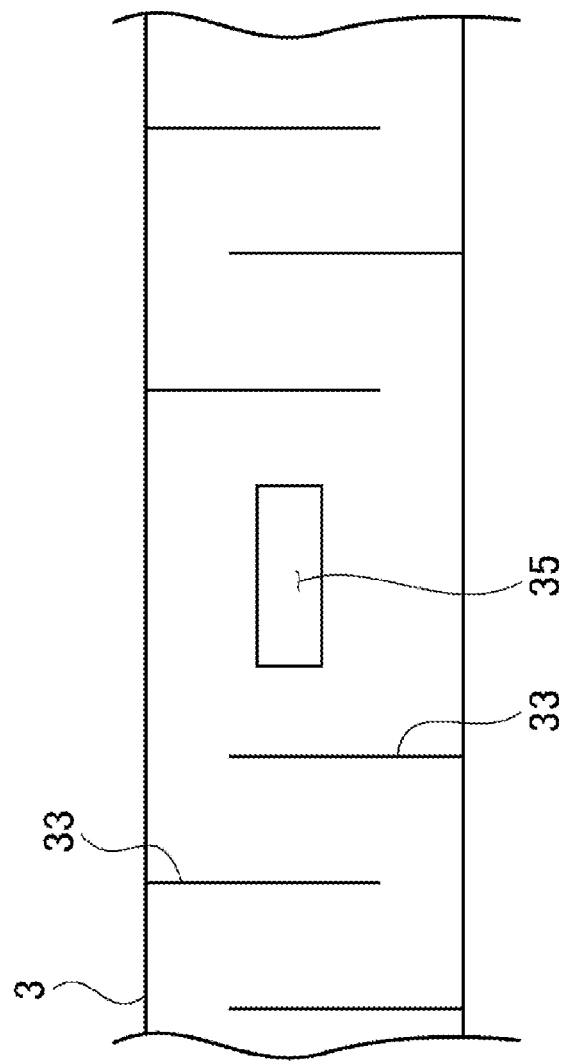

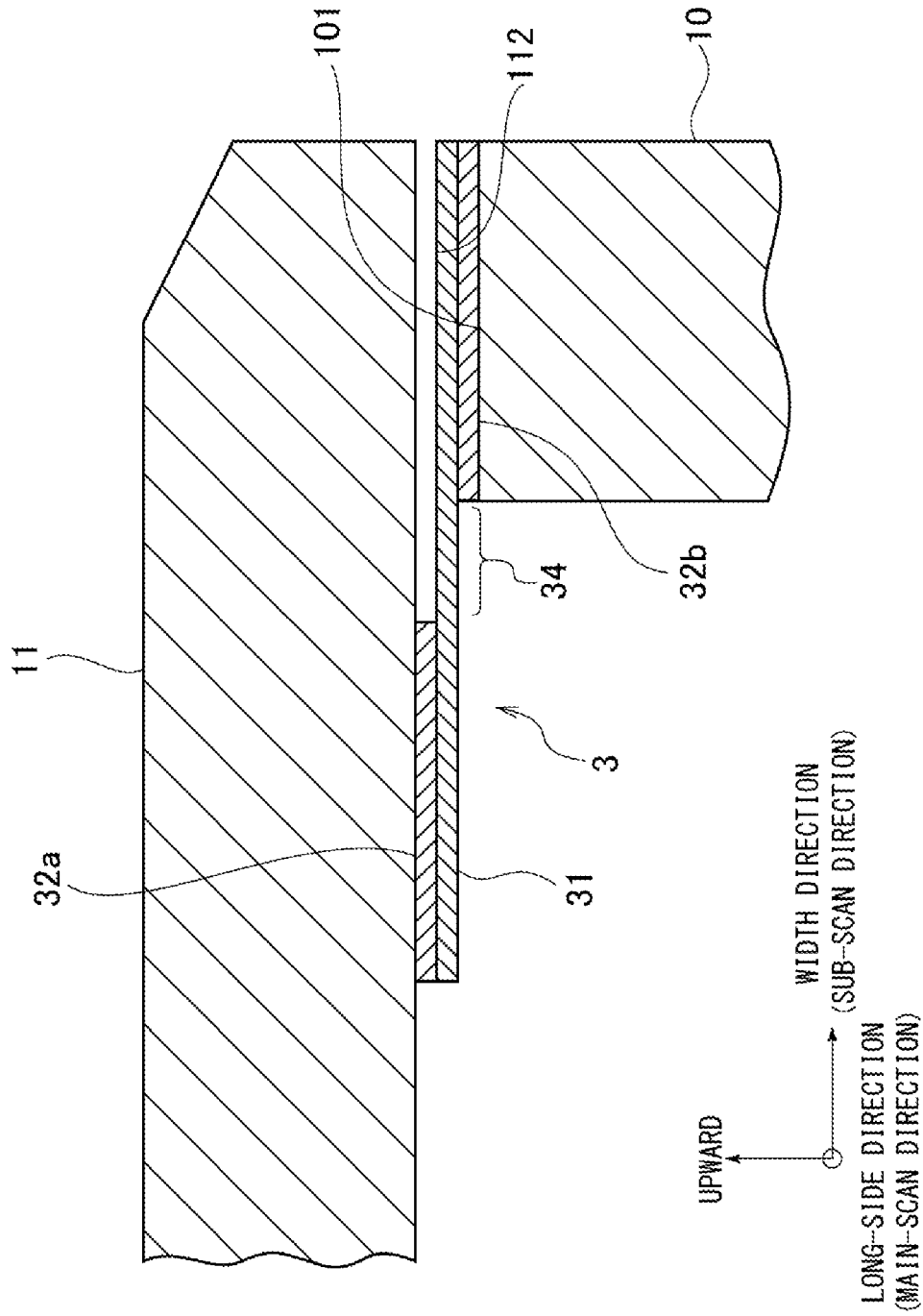

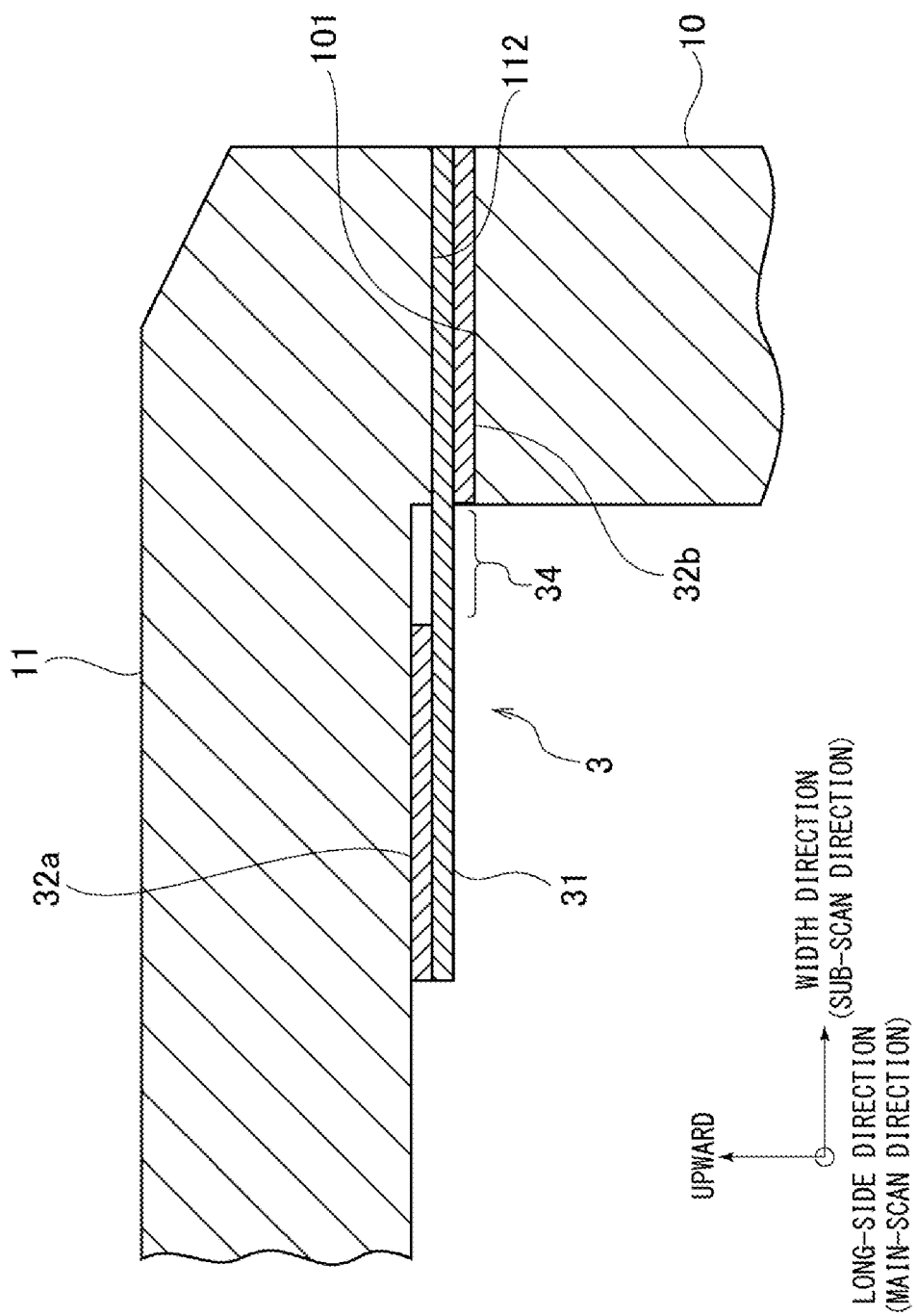

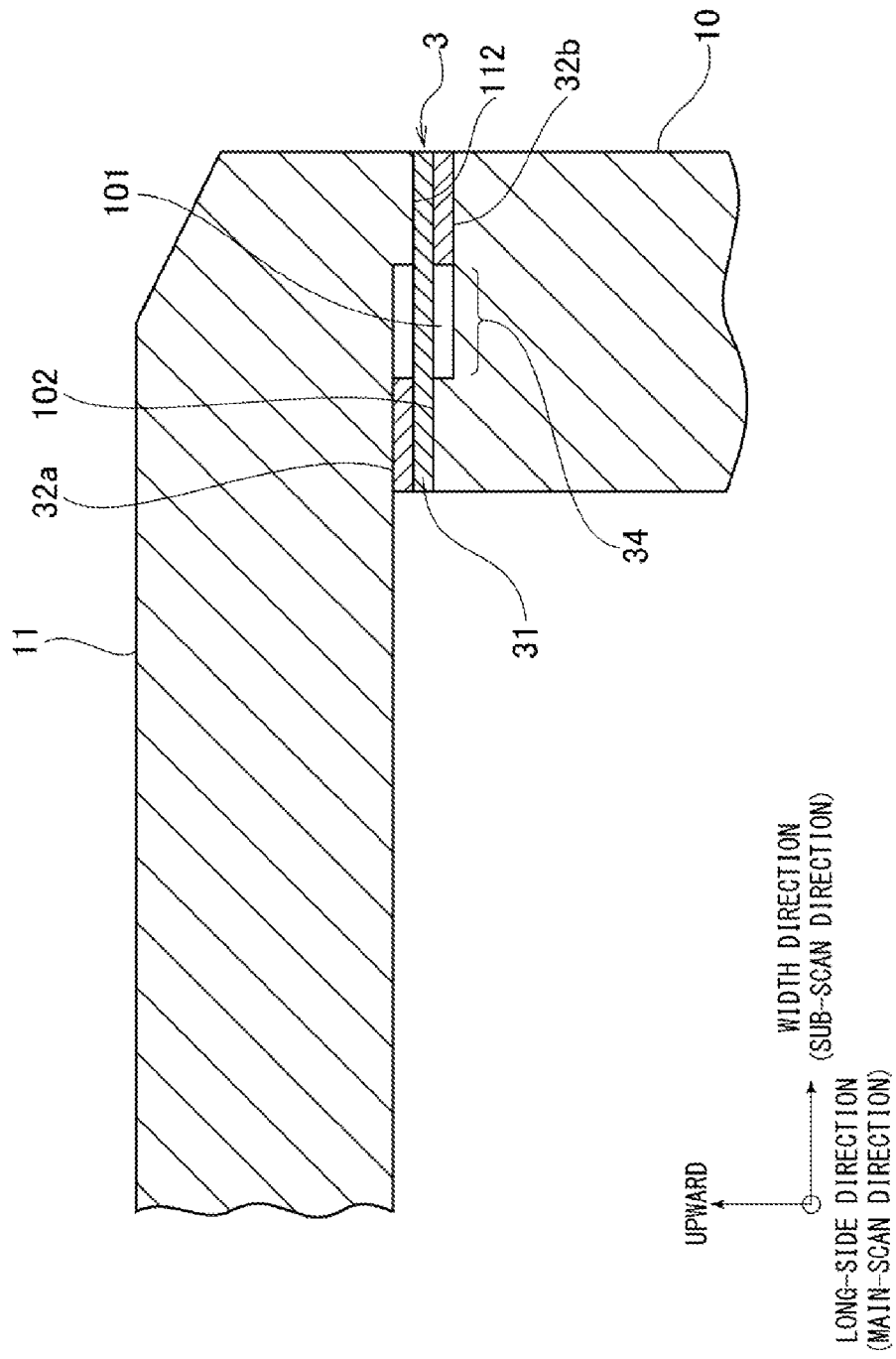

IMAGE SENSOR UNIT, PAPER SHEET DISTINGUISHING APPARATUS, IMAGE READING APPARATUS AND IMAGE FORMING APPARATUS

CROSS-REFERENCE TO RELATED APPLICATIONS

This application is based upon and claims the benefit of priority of the prior Japanese Patent Application No. 2013-098693, filed on May 8, 2013, the entire contents of which are incorporated herein by reference.

BACKGROUND OF THE INVENTION

1. Field of the Invention

The present invention relates to an image sensor unit as well as a paper sheet distinguishing apparatus, an image reading apparatus and an image forming apparatus to which the image sensor unit is applied.

2. Description of the Related Art

An image sensor unit that reads a bill or an original as an object of illumination is used in a paper sheet distinguishing apparatus, an image reading apparatus and an image forming apparatus. Conventionally, such kind of image sensor unit includes a light source, a light guide that shapes light emitted from the light source into a line, a light condenser that condenses light from an object of illumination that is a reading target, and an image sensor that detects light from the object of illumination. These optical members and elements and the like are housed in a frame of the image sensor unit and are covered by a cover member attached to the frame. In some cases, a double-sided tape is used to bond the frame and the cover member.

According to this configuration, since a force in a shearing direction is applied to the double-sided tape when the frame and cover member expand due to heat generated by the light source or the like, there is a risk that the double-sided tape will peel off from the frame or the cover member. Further, even in a case where the double-sided tape does not peel off, there is a risk that the image sensor unit will curve due to a difference between thermal deformation amounts of the frame and the cover member.

In Japanese Laid-open Patent Publication No. 2010-283436, as a configuration that suppresses the influence of temperature variations in a reading apparatus, a configuration is disclosed that prevents positional displacement between a light source and a light guide that is caused by a difference between thermal deformation amounts of a frame and the light guide. However, a configuration that prevents or suppresses peeling off of a double-sided tape or deformation of an image sensor unit that is caused by a difference between thermal deformation amounts of a frame and a cover member is not disclosed.

SUMMARY OF THE INVENTION

An object of the present invention is to make it difficult for a double-sided tape to peel off in a configuration in which a cover member is bonded using the double-sided tape.

To solve the above described problem, the present invention includes a frame in which a light source and an image sensor are housed, and a cover member that is bonded to the frame, in which: the cover member is bonded by means of a double-sided tape that has a film-shaped substrate and layers of adhesive formed on two sides of the substrate; slits that extend from one outer edge in a width direction to an intermediate portion in the width direction and slits that extend from the other outer edge in the width direction to an intermediate portion in the width direction are formed in the double-sided tape; and the respective slits that are adjacent have an overlapping portion when viewed in a long-side direction.

According to the present invention, a difference between deformation amounts caused by temperature variations of a frame and a cover member can be absorbed by a substrate of a double-sided tape changing shape. Accordingly, since a force that causes the double-sided tape to peel off can be reduced, it is possible to make it difficult for the double-sided tape to peel off.

BRIEF DESCRIPTION OF DRAWINGS

FIG. 5 is a cross-sectional schematic view illustrating a locking portion of a frame and a cover member, and an insertion hole of the double-sided tape;

FIG. 6A is a schematic plan view illustrating a relationship between slits of the double-sided tape and the locking portion;

FIG. 6B is an enlarged view of a VI-B section in FIG. 6A;

FIG. 7 is a cross-sectional schematic view illustrating a double-sided tape and a bonding structure according to a second aspect;

FIG. 8 is a cross-sectional schematic view illustrating another example of a double-sided tape and a bonding structure according to the second aspect;

FIG. 9 is a cross-sectional schematic view illustrating another example of a double-sided tape and a bonding structure according to the second aspect;

DETAILED DESCRIPTION OF THE PREFERRED EMBODIMENTS (Image Sensor Unit)

Figure 2:
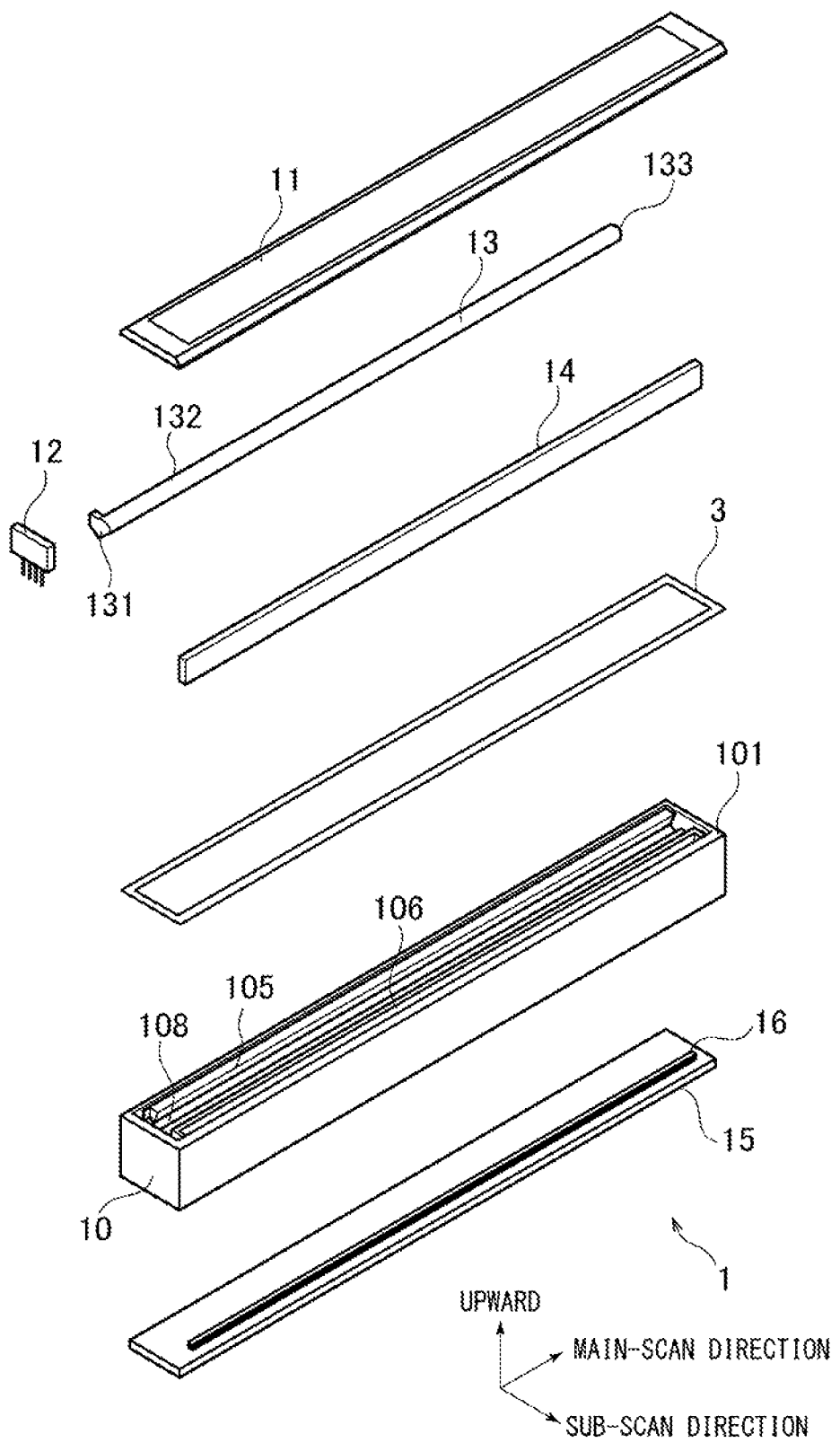
FIG. 2 is a schematic exploded view of an image sensor unit.
Figure 3:
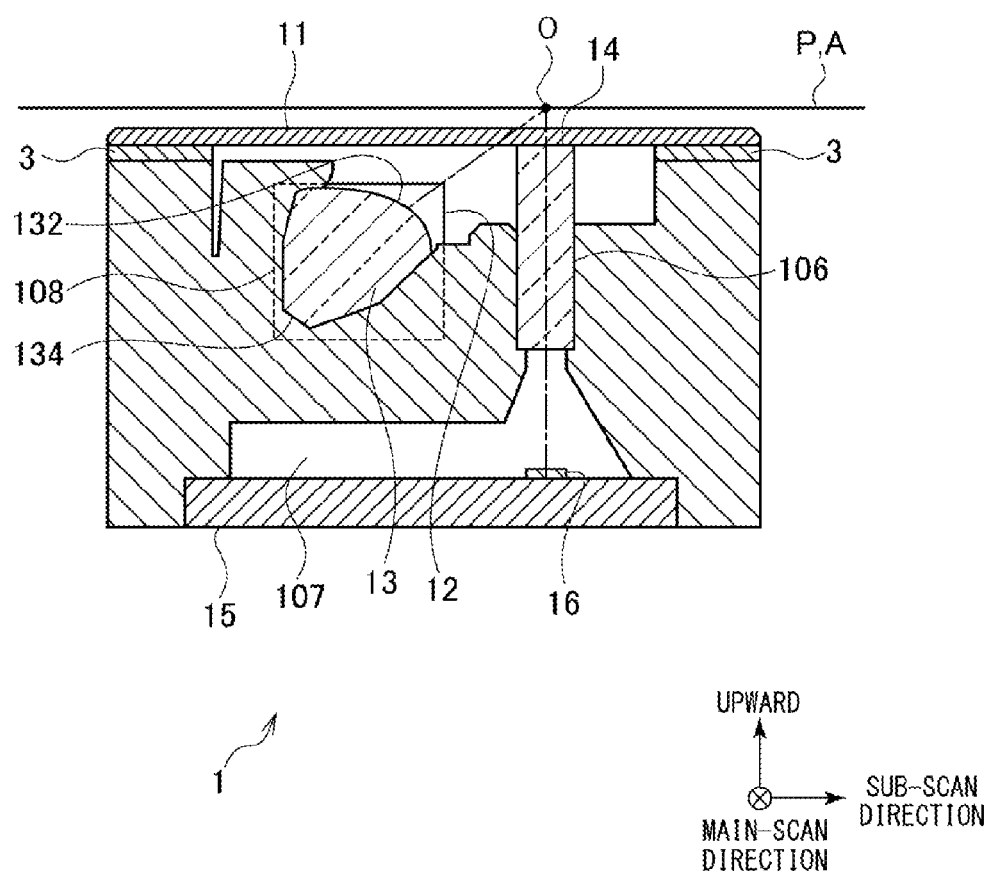
FIG. 3 is a cross-sectional schematic view of the image sensor unit.

The configuration of an image sensor unit 1 as an embodiment that can apply the present invention will be described with reference to FIG. 2 and FIG. 3. FIG. 2 is a schematic exploded view that schematically illustrates the configuration of the image sensor unit 1. FIG. 3 is an external perspective view of the image sensor unit 1. The image sensor unit 1 reads an object of illumination P by irradiating light onto the object of illumination P and detecting light from the object of illumination P. For convenience of explanation, the side over which the object of illumination P passes is referred to as an "upper side" of the image sensor unit 1. Further, in the present invention, it is assumed that the term "light" refers to not only visible light, but also includes electromagnetic waves other than visible light, such as ultraviolet light and infrared light.

As illustrated in FIG. 2, as a whole, the image sensor unit 1 has a rod-like configuration that is long in the main-scan direction. The image sensor unit 1 includes a frame 10, a cover member 11, a light source 12, a light guide 13, a light condenser 14 and a circuit board 15. An image sensor 16 is provided on an upper face of the circuit board 15.

The frame 10 is a housing of the image sensor unit 1. The frame 10 is formed by a light-blocking resin material that is colored in black. Polycarbonate can be applied as the resin material, for example. A light guide housing chamber 105 that is capable of housing the light guide 13, and a light condenser housing chamber 106 that is capable of housing the light condenser 14 are formed in an upper portion of the frame 10. A circuit board housing chamber 107 that is capable of housing the circuit board 15 is formed in a bottom portion of the frame 10. The light condenser housing chamber 106 and the circuit board housing chamber 107 are connected by an opening through which light can pass. In addition, a light source housing chamber 108 that is capable of housing the light source 12 is formed at an end in the main-scan direction of the frame 10.

The frame 10 has a rectangular shape that is long in the main-scan direction when viewed from the upper surface. A frame-like bonding surface 101 to which the cover member 11 is bonded is formed at an outer circumferential portion (four edges of a rectangle) when viewed from the upper surface. The cover member 11 is bonded to the bonding surface 101 by means of a double-sided tape 3. Further, a locking portion for positioning the cover member 11 may be formed in the bonding surface 101 (see FIG. 5; not illustrated in FIG. 2).

The cover member 11 is provided so as to cover the upper side of the frame 10. The cover member 11 has a function of protecting the light guide 13 and the light condenser 14 and a function of keeping the object of illumination P flat by coming into contact with the object of illumination P. The cover member 11 is a rectangular plate-like member that is long in the main-scan direction when viewed from the upper surface. Note that although the cover member 11 is not necessarily required in a flat-bed type image reading apparatus in which the object of illumination P does not directly contact the cover member 11 as described later and can be omitted therefrom, it is desirable to install the cover member 11 therein to protect the image sensor unit 1 from the scattering of dust and scratching. The cover member 11 is not limited to a glass material, and for example a member obtained by applying a hard coat to the surface of a transparent resin material such as an acrylic resin or polycarbonate so as to have a hardness that is equivalent to that of glass can be applied as the cover member 11. A locking portion for positioning the cover member 11 with respect to the frame 10 may also be formed in the outer circumference of the face on the lower side of the cover member 11 (see FIG. 5; not illustrated in FIG. 2).

The light source 12 is arranged at an interval from an incident surface 131 that is an end face in the main-scan direction (longitudinal direction) of the light guide 13, and the light source 12 emits light towards the incident surface 131 of the light guide 13. The light source 12 includes, for example, light emitting elements that emit light at wavelengths of red (R), green (G), blue (B) and infrared (Ir), respectively, that are sequentially turned on. Various known LEDs can be applied as the light emitting elements. The light source 12 is mounted on an upper surface of the circuit board 15 of the image sensor unit 1.

The light guide 13 is an optical member that shapes light emitted from the light source 12 into a line. The light guide 13 has an overall rod-shaped configuration that is elongated in the main-scan direction. The light guide 13, for example, is made of a transparent resin material, such as an acrylic resin, and is integrally formed by injection molding or the like.

One end face in the main-scan direction of the light guide 13 is an incident surface 131 on which light that the light source 12 emits is incident, and the other end face is a reflection surface 133 that reflects light that the light source 12 emits. An emission surface 132 and a diffusing surface 134 (see FIG. 3) that are in a band shape and long in the main-scan direction are formed on a side surface of the light guide 13. The emission surface 132 is a surface that irradiates light that is incident from the incident surface 131 and light that is reflected by the reflection surface 133, towards the object of illumination P. The diffusing surface 134 is a surface that reflects and diffuses light incident from the incident surface 131. Further, the other peripheral surfaces of the light guide 13 each serve as a reflection surface that reflects light.

Although in the present embodiment a configuration is adopted in which the light source 12 is provided at one end of the light guide 13, and one end face of the light guide 13 serves as the incident surface 131, the configuration is not limited thereto. For example, a configuration may be adopted in which the light source 12 is provided at both ends of the light guide 13. In such case, the end face of the light guide 13 does not serve as the reflection surface 133, and both end faces of the light guide 13 serve as the incident surfaces 131.

The light condenser 14 is an optical member that forms an image of the light from the object of illumination P on the surface of the image sensor 16 (described later). For example, a rod-lens array is applied as the light condenser 14. A common rod-lens array has a configuration in which a plurality of image-forming elements (rod lenses) of an erect equal magnification imaging type are linearly arranged in the main-scan direction. Note that the configuration of the light condenser 14 is not limited to a specific configuration as long as the configuration is one in which image-forming elements are linearly arranged. For example, the light condenser 14 may have a configuration in which a plurality of rows of image-forming elements are arranged. Further, various known optical members that have a light condensing function, such as various known micro-lens arrays can be applied as the light condenser 14.

The circuit board 15 has a rectangular structure that is long in the main-scan direction. The image sensor 16 and the light source 12 are mounted on the upper surface of the circuit board 15. The light source 12 is mounted in the vicinity of one end in the main-scan direction of the circuit board 15 so as to be capable of irradiating light towards the incident surface 131 of the light guide 13. On the other hand, the image sensor 16 is mounted with a light-receiving surface thereof facing the upper side so that the light-receiving surface can receive light from the light condenser 14. Connectors and the like for wire connection to the outside are further mounted on the circuit board 15.

The image sensor 16 converts light that was subjected to image formation by the light condenser 14 into an electric signal. For example, an image sensor IC array is applied as the image sensor 16. The image sensor IC array is constructed by mounting a plurality of image sensor ICs that are linearly arranged in the main-scan direction on the surface of the circuit board 15. An image sensor IC is constituted by a plurality of light receiving elements (also referred to as "photoelectric conversion elements") that correspond with the reading resolution of the image sensor unit 1. Thus, the image sensor 16 is constituted by linearly arranging the plurality of image sensor ICs in the main-scan direction. Note that it is sufficient that the image sensor 16 has a configuration in which a plurality of image sensor ICs are linearly arranged, and other parts of the configuration are not particularly limited. For example, the configuration may be one in which the image sensor ICs are arranged in a plurality of rows as in a staggered arrangement. Various kinds of image sensor ICs that are conventionally known can be applied as image sensor ICs constituting the image sensor IC array as the image sensor 16.

In addition, a mounting portion for mounting to a paper sheet distinguishing apparatus 5 or the like (described later), and a connector for electrically connecting to the paper sheet distinguishing apparatus 5 or the like are provided in the image sensor unit 1. The configuration of the mounting portion and the connector is not particularly limited. It is sufficient that the mounting portion has a configuration that enables mounting of the image sensor unit 1 to the paper sheet distinguishing apparatus 5 or the like. Further, is sufficient that the connector has a configuration that enables connection of the image sensor unit 1 to a predetermined device (for example, a circuit board) of the paper sheet distinguishing apparatus 5 or the like in a manner that enables transmitting and receiving of electric power and electric signals.

The image sensor unit 1 is assembled as follows. As illustrated in FIG. 3, the light guide 13 is housed in the light guide housing chamber 105 and the light condenser 14 is housed in the light condenser housing chamber 106 of the frame 10. The circuit board 15 on which the light source 12 and the image sensor 16 are mounted is housed in the circuit board housing chamber 107. When the circuit board 15 is housed in the circuit board housing chamber 107, the light source 12 that is mounted on the circuit board 15 is housed in the light source housing chamber 108.

The cover member 11 is bonded to the bonding surface 101 of the frame 10 by the double-sided tape 3. The double-sided tape 3 and the bonding structure produced using the double-sided tape 3 are described later.

In this state, the light source 12 faces the incident surface 131 that is one end face of the light guide 13. Consequently, light that the light source 12 emits is incident on the incident surface 131 of the light guide 13. To emit light to the object of illumination P, the light source 12 sequentially turns on the light emitting elements of each color and infrared light. The light that the light source 12 emits enters the interior of the light guide 13 from the incident surface 131 thereof, and is reflected by the diffusing surface 134 and the other reflection surface 133 and the like and thereby propagates through the interior thereof. The light is then irradiated towards a reading line O of the object of illumination P from the emission surface 132 of the light guide 13.

The light condenser 14 and the image sensor 16 face each other with a predetermined interval therebetween. The reflected light from the reading line O of the object of illumination P is formed as an image on the surface of the image sensor 16 by the light condenser 14. The image sensor 16 converts the optical image formed by the light condenser 14 into electric signals.

The image sensor unit 1 periodically repeats, in a short time, the operation of emitting light to the object of illumination P and detecting reflected light. Based on this operation, the image sensor unit 1 reads a visible light image of a predetermined pattern (for example, a hologram) provided on the object of illumination P and reads an infrared image of the object of illumination P.

Next, the double-sided tape 3 that is used to bond the cover member 11, and the fixing structure will be described. The cover member 11 is bonded to the frame 10 by the double-sided tape 3. Furthermore, entry of foreign substances from the outside is prevented by using the double-sided tape 3 to bond the frame 10 and the cover member 11 without any space therebetween.

Figure 1A:
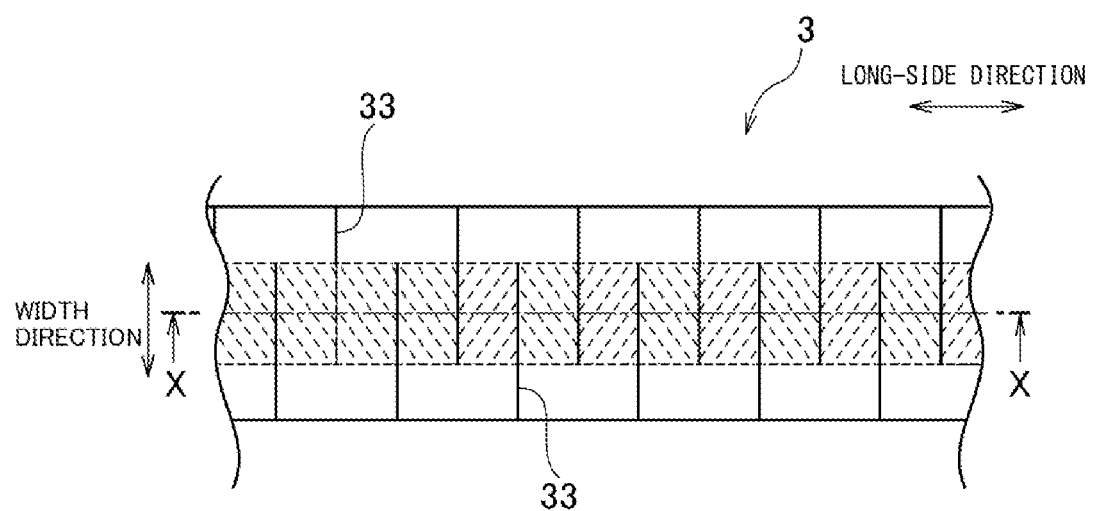
FIG. 1A is a schematic plan view illustrating the configuration of a double-sided tape according to a first aspect.
Figure 1B:
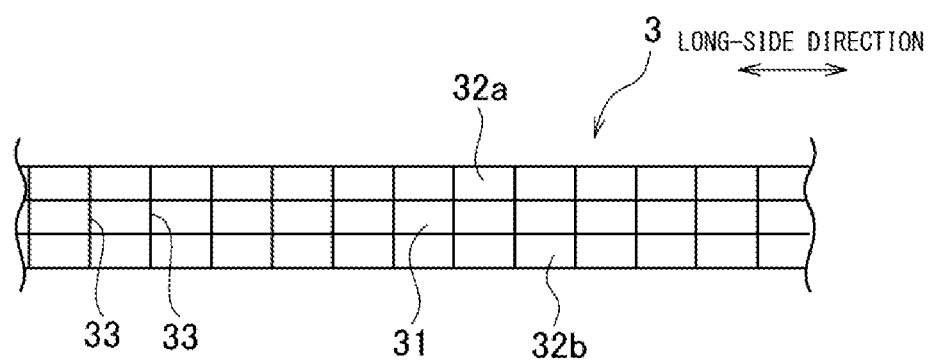
FIG. 1B is a cross-sectional schematic view of a long-side portion of the double-sided tape.

FIG. 1A is a schematic plan view that illustrates the configuration of a long-side portion of the double-sided tape. FIG. 1B is a cross-sectional schematic view of the long-side portion of the double-sided tape. The double-sided tape 3 has a film-shaped substrate 31, and adhesive layers 32a and 32b that are formed on the upper side and lower side of the substrate 31, respectively. The materials used to form the substrate 31 and the adhesive layers 32a and 32b are not particularly limited, and a known substrate and adhesive of a double-sided tape can be applied.

The double-sided tape 3 is attached along the bonding surface 101 of the frame 10 and the outer edge of the cover member 11. Consequently, when viewed from the upper surface, the double-sided tape 3 is, for example, formed with the same dimensions and shape as the bonding surface 101 of the frame 10. More specifically, the double-sided tape 3 is formed in the shape of an annular rectangle that is long in the main-scan direction see FIG. 2). Note that the double-sided tape 3 is not limited to a tape that has the same dimensions and shape as the bonding surface 101 of the frame 10.

Unless specifically stated otherwise, the following description of the double-sided tape 3 is a description of a portion that is attached to long sides of the frame 10 and the cover member 11. As illustrated in FIG. 1A, slits that extend from both sides in the width direction towards the opposite sides in the width direction are formed in an alternately staggered manner in the double-sided tape 3 in the long-side direction (main-scan direction). Note that each slit is formed from an outer edge in the width direction to an intermediate portion in the width direction and does not reach an outer edge on the opposite side in the width direction. Further, adjacent slits 33 have an overlapping portion when viewed in the long-side direction. Consequently, portions that are sandwiched by adjacent slits 33 (hatched portions in FIG. 1A) are formed in the double-sided tape 3. Since a plurality of slits 33 are alternatively formed from both sides in the width direction, a plurality of portions that are sandwiched between the slits 33 in this manner are formed side by side in the long-side direction.

Figure 1C:
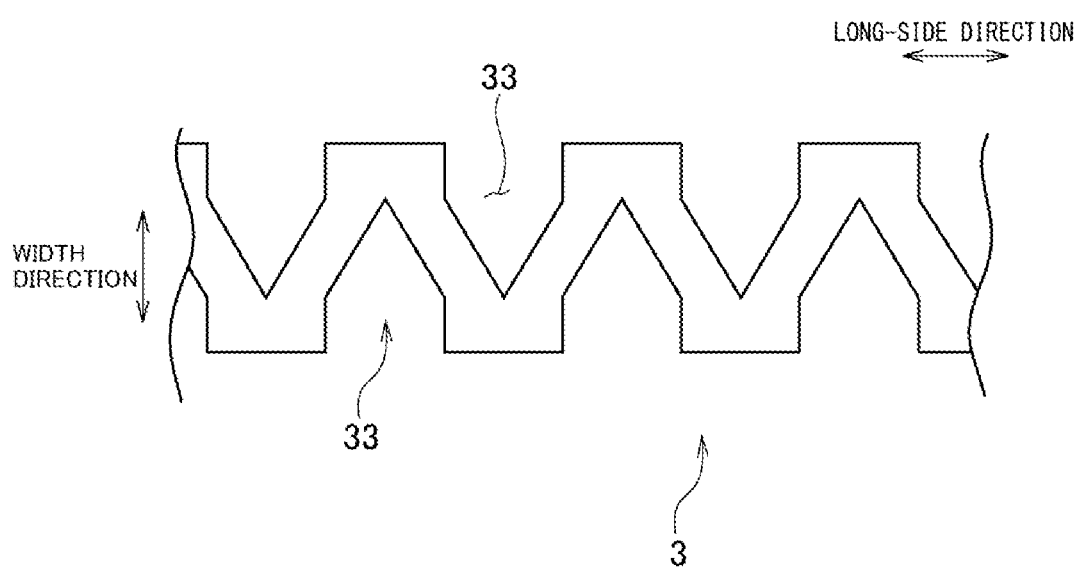
FIG. 1C is a schematic plan view illustrating a state in which the double-sided tape is expanded in the long-side direction.

FIG. 1C is a schematic plan view illustrating a state in which the double-sided tape 3 is expanded in the long-side direction (main-scan direction). In the case of the configuration in which the slits 33 are formed in this manner, the double-sided tape 3 expands as a whole in the long-side direction as a result of the portions that are sandwiched by the slits 33 changing shape in the long-side direction. That is, in the case of a configuration in which the slits 33 are not formed, the double-sided tape 3 changes shape by means of elasticity or plasticity in the long-side direction. In contrast, in the case of the configuration in which the slits 33 are formed, the portions sandwiched by the slits 33 change shape in the long-side direction in the form of a shear deformation. Therefore, it is easier for the double-sided tape 3 to change shape in the long-side direction in comparison to a configuration in which the slits 33 are not formed.

With such a configuration, when the frame 10 and the cover member 11 thermally expand, even if a relative displacement arises therebetween due to a difference in the thermal expansion coefficients thereof, the displacement can be absorbed by the double-sided tape 3 changing shape. Consequently, it is difficult for the double-sided tape 3 to peel off from the frame 10 or the cover member 11. In addition, because the double-sided tape 3 absorbs a displacement between the frame 10 and the cover member 11, deformation of the frame 10 and the cover member 11 can be prevented or suppressed. That is, in the case of a configuration in which the frame 10 and the cover member 11 are formed by materials having mutually different thermal expansion coefficients and which cannot absorb a displacement therebetween, there is a risk that the frame 10 and the cover member 11 will deform due to the difference between the thermal expansion coefficients thereof. In contrast, according to the present embodiment, such a deformation can be prevented or suppressed.

Further, according to the present embodiment, because it is difficult for the double-sided tape 3 to peel off from the frame 10 and the cover member 11, it is difficult for a gap to arise between the double-sided tape 3 and the frame 10 or the cover member 11. Therefore, it is difficult for a foreign substance to enter inside the image sensor unit 1 from the outside.

In addition, according to the present embodiment, when the double-sided tape 3 expands in the longitudinal direction, although the slits 33 widen, a situation does not arise in which the double-sided tape 3 breaks in the middle in the long-side direction. Consequently, a gap through which a foreign substance can enter inside the image sensor unit 1 from the outside does not arise between the frame 10 and the cover member 11. Accordingly, the dust resistance is not lowered by the double-sided tape 3.

Thus, according to the present embodiment, expansion of the double-sided tape 3 in the long-side direction can be facilitated without lowering the dust resistance.

Various forms of the slit 33 will now be described.

Figure 4A:
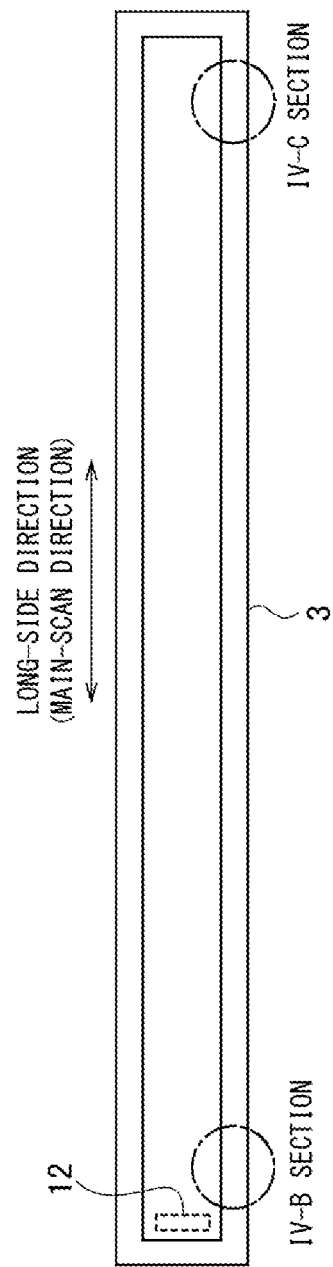
FIG. 4A is a schematic plan view illustrating a relationship between slits of the double-sided tape and a light source.
Figure 4B:
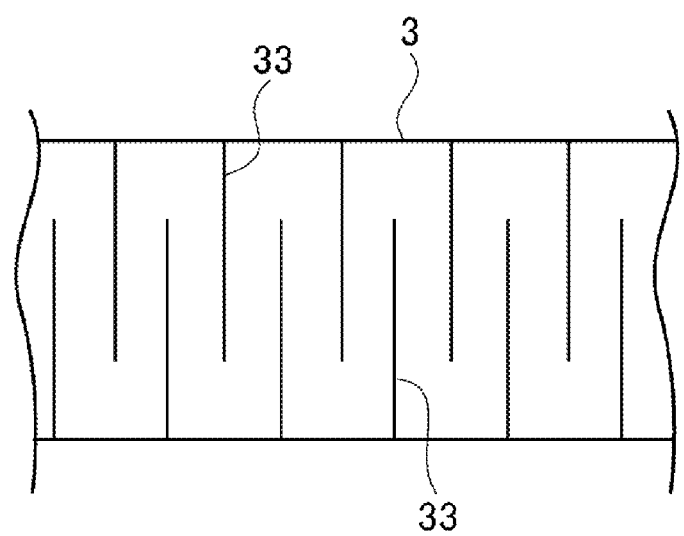
FIG. 4B is an enlarged view of an IV-B section in FIG. 4A.
Figure 4C:
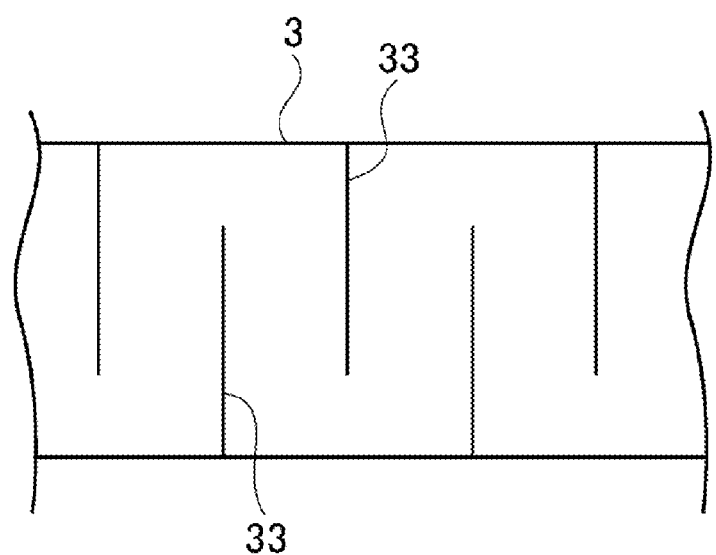
FIG. 4C is an enlarged view of an IV-C section in FIG. 4A.

FIG. 4A is a view that schematically illustrates a relationship between the position of the light source 12 and an interval between the slits 33 of the double-sided tape 3. FIG. 4B is an enlarged view of an IV-B section in FIG. 4A. FIG. 4C is an enlarged view of an IV-C section in FIG. 4A. In the image sensor unit 1, a temperature of a portion in the vicinity of the light source 12 is higher relative to other portions due to heat that the light source 12 emits. Consequently, a thermal deformation amount of the frame 10 and the cover member 11 also increases in accordance with the proximity in the main-scan direction (long-side direction of the double-sided tape 3) of the frame 10 or the cover member 11 to the light source 12. Therefore, as illustrated in FIG. 4A to FIG. 4C, the interval between slits is made smaller in the vicinity of the light source 12 (IV-B section in FIG. 4A), and the interval between slits is made larger at a portion that is far from the light source 12 in the main-scan direction (IV-C section in FIG. 4A).

For example, in the case of a configuration in which the light source 12 is provided at one end in the main-scan direction, the interval between the slits 33 is reduced in accordance with the proximity of the slits 33 to the aforementioned one end in the main-scan direction (long-side direction), and the interval between the slits 33 is increased as the distance of the slits 33 from the aforementioned one end increases in the main-scan direction. That is, with respect to the main-scan direction, the interval between the slits 33 on the side of the one end on which the light source 12 is provided is reduced compared to the interval between the slits 33 on the side of the other end on which the light source 12 is not provided. Further, if the configuration is one in which the light source 12 is provided at both ends in the main-scan direction, the interval between the slits 33 is reduced in accordance with the proximity of the slits 33 to the two ends in the main-scan direction, and the interval between the slits 33 is increased in accordance with the proximity of the slits 33 to the center in the main-scan direction. That is, the interval between the slits 33 at both ends in the main-scan direction is reduced in comparison to the interval between the slits 33 at a center portion in the main-scan direction.

When the interval between the slits 33 is small, the width (dimension in the long-side direction based on the frame 10) of a portion that is sandwiched by the slits decreases and hence a change in shape in the long-side direction is facilitated. Therefore, as described in the foregoing, by reducing the intervals between the slits 33 as the slits 33 approach the light source 12, expansion that tracks a thermal deformation is facilitated at a portion in which a deformation amount is large. According to this configuration, peeling off of the double-sided tape 3 can be made difficult at a place at which a thermal deformation amount is large also.

Note that, with respect to the intervals between the slits 33, a configuration may be adopted in which the intervals change smoothly or a configuration may be adopted in which the intervals change in a stepwise manner.

Further, although the light source 12 has been described as an example of a heat generating source, the present invention can also be applied to a heat generating source other than the light source 12. In short, it is sufficient that a configuration is adopted in which intervals between the slits 33 are small in the vicinity of the heat generating source, and intervals between the slits 33 are large at portions that are relatively far from the heat generating source.

Figure 6C:
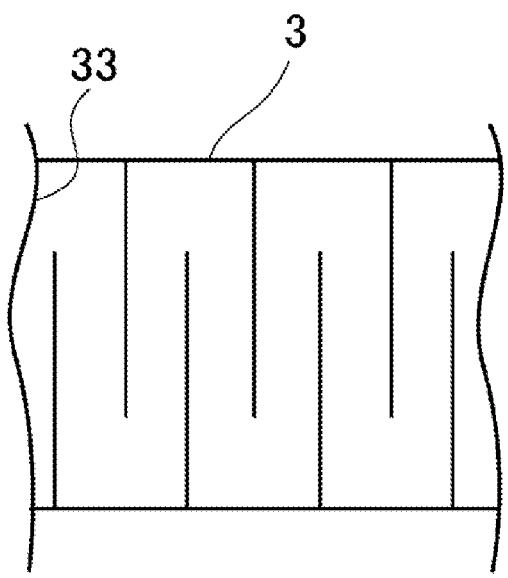
FIG. 6C is an enlarged view of a VI-C section in FIG. 6A.

FIG. 5 is a perspective view that schematically illustrates a relationship between locking portions 103 and 113 formed in the frame 10 and cover member 11 and an insertion hole 35 formed in the double-sided tape 3. FIG. 6A is a schematic plan view that illustrates a relationship between the locking portions formed in the frame 10 and cover member 11 and intervals between the slits 33 formed in the double-sided tape 3. FIG. 6B is an enlarged view of a VI-B section in FIG. 6A. FIG. 6C is an enlarged view of a VI-C section in FIG. 6A.

As illustrated in FIG. 5, locking portions 103 and 113 for positioning are formed in the bonding surface 101 of the frame 10 and the cover member 11. A protruding portion that is formed in one of the bonding surface 101 of the frame 10 and the cover member 11, and a concave portion that is formed in the other of the bonding surface 101 of the frame 10 and the cover member 11 are applied as the locking portions 103 and 113. In FIG. 5 a configuration is illustrated in which the protruding portion is formed as the locking portion 103 of the frame 10, and the concave portion is formed as the locking portion 113 of the cover member 11. However, a configuration may also be adopted in which the concave portion is formed in the frame 10 and the protruding portion is formed in the cover member 11.

The cover member 11 is positioned with respect to the frame 10 by fitting the protruding portion formed in one of the bonding surface 101 of the frame 10 and the cover member 11 into the concave portion formed in the other thereof.

In this configuration, relative displacement between the frame 10 and the cover member 11 is restricted by the locking portions. Consequently, a displacement amount in a case where the frame 10 and the cover member 11 undergo thermal deformation is smallest in the vicinity of the locking portions and increases as a distance from the locking portions increases.

As illustrated in FIG. 5, the insertion hole 35 through which the protruding portion as the locking portion 103 is inserted is formed in the double-sided tape 3.

Further, as illustrated in FIG. 6A to FIG. 6C, intervals between the slits 33 are large in the vicinity (VI-B section in FIG. 6A) of the insertion hole 35 (locking portions 103 and 113), and intervals between the slits 33 are small at positions that are far from the insertion hole 35 (VI-C section in FIG. 6A).

According to this configuration, a deformation amount of the double-sided tape 3 is large at a portion (D section) at which the displacement amount is large that is far from the insertion hole (locking portion), and it can thus be made difficult for the double-sided tape 3 to peel off.

Note that although a configuration in which the locking portions 103 and 113 and the insertion hole 35 are formed in the center in the long-side direction is illustrated in FIG. 6A, the configuration is not limited to these positions and numbers.

Next, a second aspect of the double-sided tape 3 will be described. FIG. 7 is a cross-sectional view that schematically illustrates a bonding structure between the frame 10 and the cover member 11 that uses the double-sided tape 3 according to the second aspect. As illustrated in FIG. 7, at a portion that bonds the respective long sides of the frame 10 and the cover member 11, the adhesive layers 32a and 32b on the upper side and lower side of the double-sided tape 3 are formed at positions that deviate to opposite sides to each other with respect to the width direction (sub-scan direction) of the substrate 31. Further, when viewed from the upper surface, the adhesive layers 32a and 32b that are formed on the upper side and lower side do not overlap. Consequently, in the substrate 31, a portion at which the adhesive layers 32a and 32b are not formed on either of the upper side and the lower side is formed at a center part in the width direction (sub-scan direction). This portion is referred to as a "non-adhesive portion 34". The non-adhesive portion 34 extends in the longitudinal direction (main-scan direction).

The adhesive layer 32b on the lower side is adhered to the bonding surface 101 of the frame 10. Because the width of the adhesive layer 32b of the lower side is the same as the width of the bonding surface 101 of the frame 10, the adhesive layer 32b adheres to the entire bonding surface 101 of the frame 10. Further, the adhesive layer 32a on the upper side adheres to a region of the lower face of the cover member 11 that is a region that is further on the inner side than the bonding surface 101 of the frame 10 when viewed from the upper surface (region that does not overlap with the bonding surface 101 when viewed from the upper surface).

Consequently, the non-adhesive portion 34 of the double-sided tape 3 can change shape without receiving interference from other members. With this configuration, in a case where the frame 10 and the cover member 11 expand due to a temperature increase, a displacement between the frame 10 and the cover member 11 is absorbed by a change in shape of the non-adhesive portion 34. Accordingly, it can be made difficult for the adhesive layers 32a and 32b to peel off from the frame 10 and the cover member 11. Further, a deformation that is due to a difference between the coefficients of thermal expansion of the frame 10 and the cover member 11 can be decreased by a change in shape of the non-adhesive portion 34.

Furthermore, the adhesive layers 32a and 32b on the upper side and the lower side are formed continuously over the entire outer circumference of the frame 10 and the cover member 11. Consequently, the dust resistance does not decrease.

Another example of the second embodiment will now be described. FIG. 8 is a cross-sectional view that schematically illustrates a bonding structure for bonding the frame 10 and the cover member 11 that uses the double-sided tape 3 according to the second aspect.

In the example shown in FIG. 8, an outer circumferential edge of the cover member 11 protrudes downwards. This portion is referred to as a "cover-side convex portion 112". The height (thickness) of the cover-side convex portion 112 is, for example, set to the same thickness as that of the adhesive layer 32a on the upper side. Further, for example, the width of the cover-side convex portion 112 is set to the same width as that of the bonding surface 101 of the frame 10. Therefore, when the cover member 11 is attached to the frame 10, the bonding surface 101 of the frame 10 and the lower face of the cover-side convex portion 112 face each other in a manner such that the double-sided tape 3 is sandwiched therebetween.

Further, the adhesive layer 32b on the lower side is adhered to the bonding surface 101 of the frame 10. Because the width of the adhesive layer 32b on the lower side is the same as the width of the bonding surface 101 of the frame 10, the adhesive layer 32b adheres to the entire bonding surface 101 of the frame 10. Further, the adhesive layer 32a on the upper side adheres to the lower face of the cover member 11 at a position that is further to the inner side relative to the cover-side convex portion 112. Therefore, the cover-side convex portion 112 contacts a portion of the upper side of the substrate 31 at which the adhesive layer 32a is not formed.

Because the non-adhesive portion 34 is formed in the double-sided tape 3, the adhesive layer 32a on the upper side and the cover-side convex portion 112 do not come in contact. Therefore, the non-adhesive portion 34 of the double-sided tape 3 is in a state in which the non-adhesive portion 34 does not come in contact with other members, and can change shape without receiving interference from other members. Accordingly, similar advantageous effects as those described above can be obtained.

In addition, the cover-side convex portion 112 comes in contact with a portion of the upper side of the substrate 31 of the double-sided tape 3 at which the adhesive layer 32a is not formed. When configured in this manner, because a state is not entered in which the cover member 11 floats in midair, the accuracy with respect to the position in the vertical direction of the cover member 11 does not decrease.

Note that, although according to the present embodiment a configuration has been illustrated in which the width of the double-sided tape 3 is greater than the width of the bonding surface 101 of the frame 10, a configuration may also be adopted in which the width of the double-sided tape 3 is the same as the width of the bonding surface 101 of the frame 10. A configuration in which the width of the double-sided tape 3 is the same as the width of the bonding surface 101 of the frame 10 will now be described. FIG. 9 is a cross-sectional schematic view illustrating a configuration in which the width of the double-sided tape 3 and the width of the bonding surface 101 of the frame 10 are the same.

As illustrated in FIG. 9, on one side in the width direction of the bonding surface 101 of the frame 10, a portion (hereunder, referred to as "frame-side convex portion 102") that protrudes towards the upper side (side of the cover member 11) is formed in a band shape continuously across the entire length in the longitudinal direction. In FIG. 9, a configuration is illustrated in which the frame-side convex portion 102 is formed along the inner circumferential side of the bonding surface 101. On the other hand, in the cover member 11, similarly to the present embodiment, a cover-side convex portion 112 is formed that protrudes towards the lower side (side of the frame 10). The frame-side convex portion 102 and the cover-side convex portion 112 are formed at positions that deviate from each other in the width direction. Further, in a state in which the cover member 11 is attached to the frame 10, when viewed from the upper surface, the frame-side convex portion 102 and the cover-side convex portion 112 do not overlap and a gap is formed therebetween. This gap is formed in a band shape across the entire length in the longitudinal direction. The cover-side convex portion 112 faces a portion other than the frame-side convex portion 102 of the bonding surface 101 of the frame 10.

The width of the double-sided tape 3 is set to the same width as the overall width of the bonding surface 101 including the frame-side convex portion 102 of the frame 10. The width of the adhesive layer 32*b* on the lower side is set to the same width as that of the cover-side convex portion 112. Likewise, the width of the adhesive layer 32*a* on the upper side is set to the same width as that of the frame-side convex portion 102.

The adhesive layer 32*b* on the lower side adheres to a portion of the bonding surface 101 of the frame other than the frame-side convex portion 102. Further, the adhesive layer 32*a* on the upper side adheres to a portion of the lower face of the cover member 11 other than the cover-side convex portion 112. Thus, the cover member 11 is bonded to the frame 10.

In a state in which the cover member 11 is bonded to the frame 10, the adhesive layer 32*b* on the lower side and the frame-side convex portion 102 are positioned on opposite sides to each other with respect to the width direction of the double-sided tape 3. Further, the adhesive layer 32*b* on the lower side and the frame-side convex portion 102 do not come in contact, and a gap is formed therebetween. Likewise, the adhesive layer 32*a* on the upper side and the cover-side convex portion 112 are positioned on opposite sides to each other with respect to the width direction of the double-sided tape 3. Further, the adhesive layer 32*a* on the upper side and the cover-side convex portion 112 do not come in contact, and a gap is formed therebetween.

The gap formed on the upper side of the double-sided tape 3 and the gap formed on the lower side thereof overlap when viewed from the upper surface. Consequently, the state is such that the non-adhesive portion 34 of the double-sided tape 3 does not come in contact with any other member, and can change shape without receiving interference from another member. According to this configuration, similar advantageous effects can be obtained as those obtained by the above described configuration in which the width of the double-sided tape 3 is greater than the width of the bonding surface 101 of the frame 10.

Thus, the width of the double-sided tape 3 may be the same as that of the bonding surface 101 of the frame 10 or may be greater than that of the bonding surface 101.

Note that because a thermal deformation amount in the short-side direction is small compared to a thermal deformation amount in the long-side direction, the influence of a difference between the coefficients of thermal expansion is smaller in the short-side direction. Therefore, the configuration of a short-side bonding structure between the frame 10 and the cover member 11 is not particularly limited. For example, the configuration of the short-side bonding structure may be a configuration that is similar to any of the configurations described above, or may be a configuration in which the slits 33 or the non-adhesive portion 34 are not formed in the double-sided tape 3.

Note that although a configuration in which the double-sided tape 3 is formed in the shape of an annular rectangle that is the same shape as the bonding surface 101 is described according to the present embodiment, the present invention is not limited to this configuration. For example, a configuration may be adopted in which the double-sided tape 3 is formed in a simple band shape. In this case, the band-shaped double-sided tape 3 is attached to each side of the bonding surface 101 and the cover member 11. Further, in this case, a configuration is adopted so that gaps do not arise at the respective joints of the double-sided tape 3 attached to each side.

The parts of the image sensor unit 1 not illustrated and not described can be the same as in conventional well-known image sensor units 1.

Note that, in each of the above described embodiments, a configuration may also be adopted in which the frame 10 and the cover member 11 are bonded in a state in which the slits 33 of the double-sided tape 3 are open (state in which gaps are formed). That is, the double-sided tape 3 may already be in the state illustrated in FIG. 1C. With this configuration, in a case where the frame 10 or the cover member 11 contracts due to a drop in the temperature thereof, the double-sided tape can change shape in a manner that follows the contraction. Consequently, even in a case where the frame 10 or the cover member 11 contracts, peeling off of the double-sided tape 3 can be prevented or suppressed. Therefore, according to this configuration, peeling off of the double-sided tape 3 can be prevented or suppressed in both a case where the frame 10 or the cover member 11 expands and a case where the frame 10 or the cover member 11 contracts.

(Paper Sheet Distinguishing Apparatus)

Figure 10:
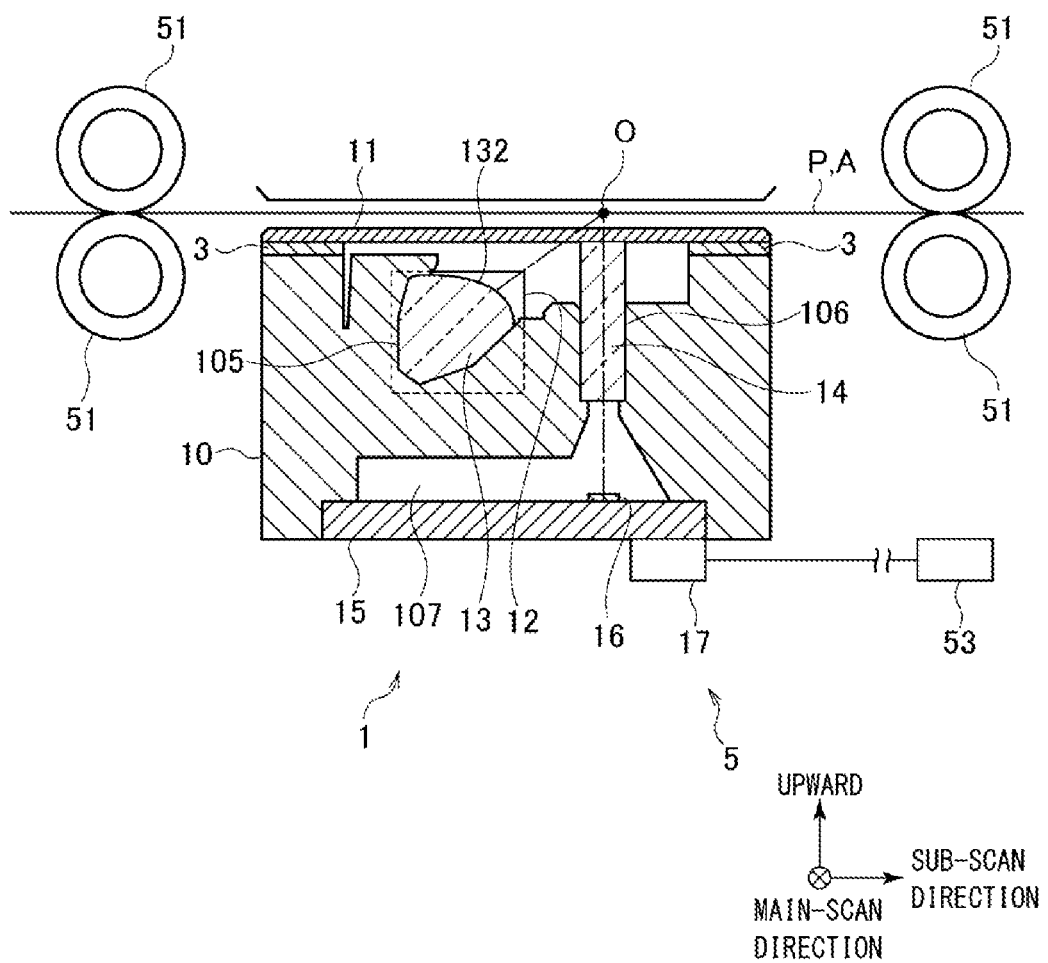
FIG. 10 is a cross-sectional schematic view illustrating the configuration of essential parts of a paper sheet distinguishing apparatus.

The paper sheet distinguishing apparatus 5 to which the image sensor unit 1 is applied will be described with reference to FIG. 10. FIG. 10 is a cross-sectional view that schematically illustrates the configuration of the paper sheet distinguishing apparatus 5, and illustrates a cross section taken along a plane perpendicular to the main-scan direction. The paper sheet distinguishing apparatus 5 emits light to a bill or the like as the object of illumination P to read light from the bill and uses the read light to distinguish the type or authenticity of the bill.

As illustrated in FIG. 10, the paper sheet distinguishing apparatus 5 includes the image sensor unit 1, an image distinguishing portion 53 as distinguishing means that is connected by wire to the connector 17, and conveyor rollers 51 that convey the bill. A conveyance path A for conveying a bill that is sandwiched by the conveyor rollers 51 in the reading direction (sub-scan direction) over the image sensor unit 1 through the cover member 11 is set in the paper sheet distinguishing apparatus 5. Note that a focal point on the bill side of the light condenser 14 is set at the center of the conveyance path A.

The operation of the paper sheet distinguishing apparatus 5 having this configuration is as follows. Based on the operation described above, the image sensor unit 1 applied to the paper sheet distinguishing apparatus 5 reads a visible light image of a predetermined pattern provided on the bill and reads an infrared image of the bill. The image distinguishing portion 53 then determines the authenticity of the bill by comparing a genuine bill image, which is obtained by emitting visible light and infrared light to a prepared genuine bill, with the visible light image and the infrared image of the bill to be determined in the authenticity determination. This is because the genuine bill includes a region in which the images obtained under visible light and under infrared light are different.

The parts not described and not illustrated can be the same as in a conventional paper sheet distinguishing apparatus 5. Further, a configuration may also be adopted in which the image distinguishing portion 53 is provided on the circuit board 15.

Figure 11:
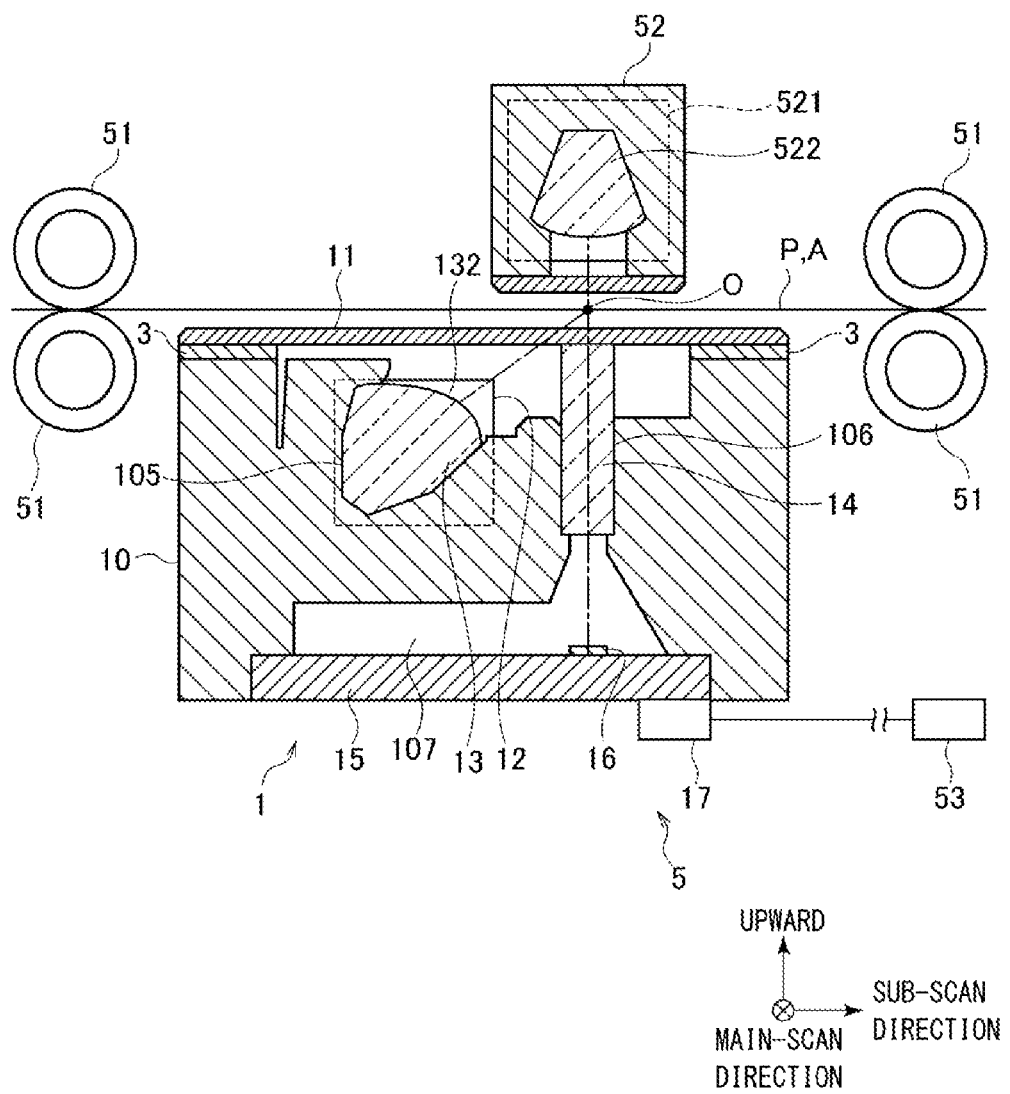
FIG. 11 is a cross-sectional schematic view illustrating the configuration of essential parts of a paper sheet distinguishing apparatus.

FIG. 11 is a cross-sectional view that schematically illustrates a configuration of the paper sheet distinguishing apparatus 5 further including a transmission illumination apparatus 52.

The transmission illumination apparatus 52 includes a light source 521 and a light guide 522. The light source 521 and the light guide 522 of the transmission illumination apparatus 52 have the same configurations as those of the light source 12 and the light guide 13 described above. The transmission illumination apparatus 52 is arranged at a position facing the image sensor unit 1 so as to be capable of emitting light to a bill. Particularly, the transmission illumination apparatus 52 is arranged so that an optical axis of the light emitted from the emission surface of the light guide 522 and an optical axis of the light condenser 14 of the image sensor unit 1 coincide.

The operation of the paper sheet distinguishing apparatus 5 with the configuration is as follows. The light source 12 incorporated into the image sensor unit 1 and the light source 521 of the transmission illumination apparatus 52 sequentially turn on the light emitting elements of the visible light of each color and the infrared light.

The light emitted from the light guide 13 of the image sensor unit 1 to the bill is reflected by the surface of the bill and enter the light condenser 14, and an image is formed on the surface of the image sensor 16. The image sensor 16 converts the formed optical image to an electric signal to acquire a visible light image and an infrared image based on the reflected light from the bill. Meanwhile, the light emitted from the transmission illumination apparatus 52 to the bill is transmitted through the bill to enter the light condenser 14 of the image sensor unit 1, and an image is formed on the surface of the image sensor 16. The image sensor 16 converts the formed optical image to an electric signal to acquire a visible light image and an infrared image based on the transmitted light from the bill.

The image sensor unit 1 and the transmission illumination apparatus 52 alternately repeat, in a short time, the operation of emitting light to the bill and detecting the reflected light and the transmitted light. Based on the operation, the image sensor unit 1 reads a visible light image of a predetermined pattern (for example, a hologram) provided on the bill and reads an infrared image of the bill.

According to this configuration, the paper sheet distinguishing apparatus 5 can read the visible light image and the infrared image obtained based on the reflected light and the transmitted light of the bill.

Figure 12:
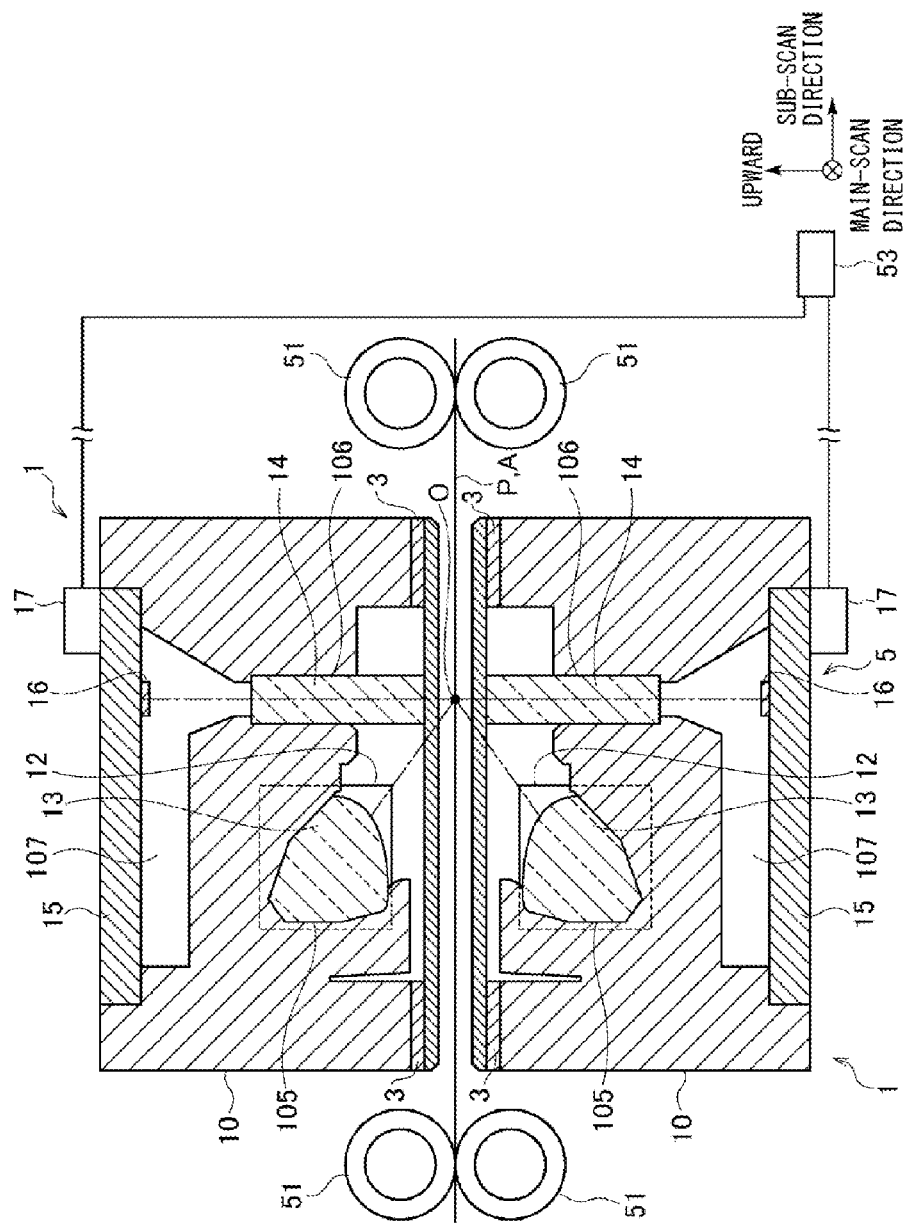
FIG. 12 is a cross-sectional schematic view illustrating the configuration of essential parts of a paper sheet distinguishing apparatus.

The paper sheet distinguishing apparatus 5 may also include two sets of image sensor units 1. FIG. 12 is a cross-sectional view that schematically illustrates the configuration of the paper sheet distinguishing apparatus 5 including two sets of image sensor units 1.

As illustrated in FIG. 12, the two sets of image sensor units 1 are arranged to face each other across the conveyance path A of the bill. The two sets of Image sensor units 1 are arranged so that the light emitted from the light guide 13 of one of the image sensor units 1 and transmitted through the bill enters the light condenser 14 of the other image sensor unit 1.

The operation of the paper sheet distinguishing apparatus 5 with this configuration is as follows. The light sources 12 that are incorporated into the two sets of image sensor units 1 sequentially turn on the light emitting elements of the visible light of each color and the infrared light. The light emitted from the illumination apparatus of one of the image sensor units 1 to the bill is reflected by the surface of the bill and enters the light condenser 14 of one of the image sensor units 1, and an image is formed on the surface of the image sensor 16 of one of the image sensor units 1. The image sensor 16 of the one of the image sensor units 1 converts the formed optical image to an electric signal to acquire a visible light image and an infrared image based on the reflected light from the bill. Further, the light emitted from the illumination apparatus of one of the image sensor units 1 to the bill is transmitted through the bill and enters the light condenser 14 of the other image sensor unit 1, and an image is formed on the surface of the image sensor 16 of the other image sensor unit 1. The image sensor of the other image sensor unit 1 converts the formed optical image to an electric signal to acquire a visible light image and an infrared image based on the transmitted light from the bill.

According to this configuration, the paper sheet distinguishing apparatus 5 can read reflected images of both surfaces of the bill and can read transmitted images.

Note that although a configuration that reads a visible light image and an infrared image of a bill by emitting visible light and infrared light is described in the present embodiment, the present invention is not limited to such a configuration. For example, a configuration may be adopted that emits ultraviolet light.

Further, although a configuration has been described in which a bill is applied as the object of illumination P, the type of the paper sheet is not limited. For example, various kinds of securities or ID cards or the like are applicable.

(Image Reading Apparatus (Part 1))

Figure 13:
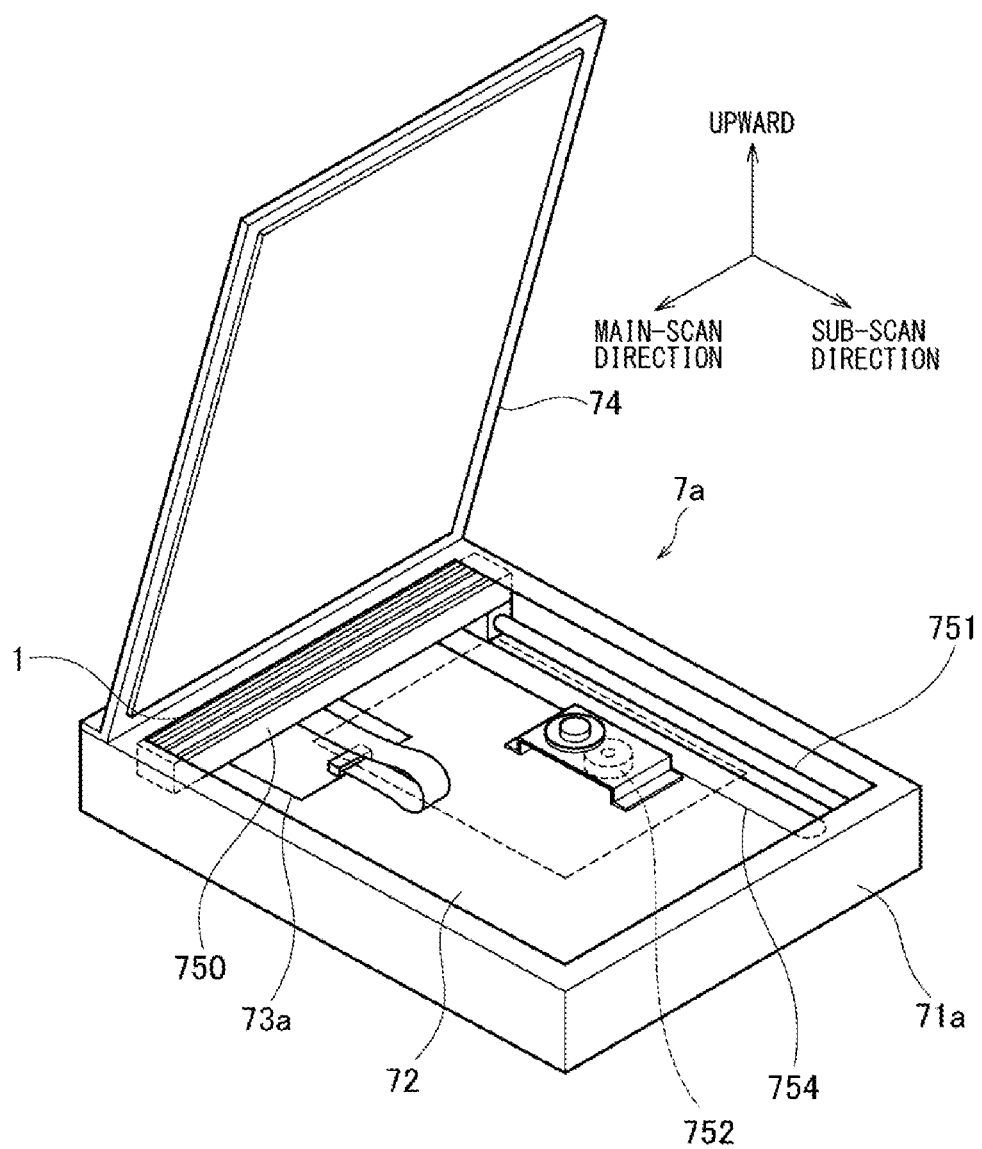
FIG. 13 is an external perspective view of a flat-bed type image reading apparatus.

FIG. 13 is a perspective view illustrating the configuration of a flat-bed type scanner 7a as an image reading apparatus to which the image sensor unit 1 that is an embodiment of the present invention can be applied.

The scanner 7a includes a housing 71a, a platen glass 72 as an object of illumination placing part, the image sensor unit 1, a driving mechanism that drives the image sensor unit 1, a circuit board 73a, and a platen cover 74.

The platen glass 72 as the object of illumination placing part is composed of a transparent plate such as a glass plate, and is mounted to the upper face of the housing 71a.

The platen cover 74 is attached in a manner allowing opening and closing thereof to the housing 71a through a hinge mechanism or the like so as to cover the object of illumination P that has been placed on the platen glass 72.

The image sensor unit 1, the driving mechanism for driving the image sensor unit 1, and the circuit board 73a are housed inside the housing 71a.

The driving mechanism includes a holding member 750, a guide shaft 751, a drive motor 752 and a wire 754. The holding member 750 surrounds and holds the image sensor unit 1. The guide shaft 751 movably guides the holding member 750 in the reading direction (sub-scan direction) along the platen glass 72. The drive motor 752 and the holding member 750 are coupled through the wire 754, and the holding member 750 that holds the image sensor unit 1 is driven in the sub-scan direction by a driving force of the drive motor 752. The image sensor unit 1 reads the object of illumination P that was placed on the platen glass 72, while moving in the sub-scan direction under the driving force of the drive motor 752.

Thus, the object of illumination P is read while relatively moving the image sensor unit 1 and the object of illumination P with respect to each other.

An image processing circuit that performs predetermined image processing on an image that was read by the image sensor unit 1, a control circuit that controls each portion of the scanner 7a including the image sensor unit 1, and a power supply circuit that supplies power to each portion of the scanner 7a and the like are constructed on the circuit board 73a.

(Image Reading Apparatus (Part 2))

Figure 14:
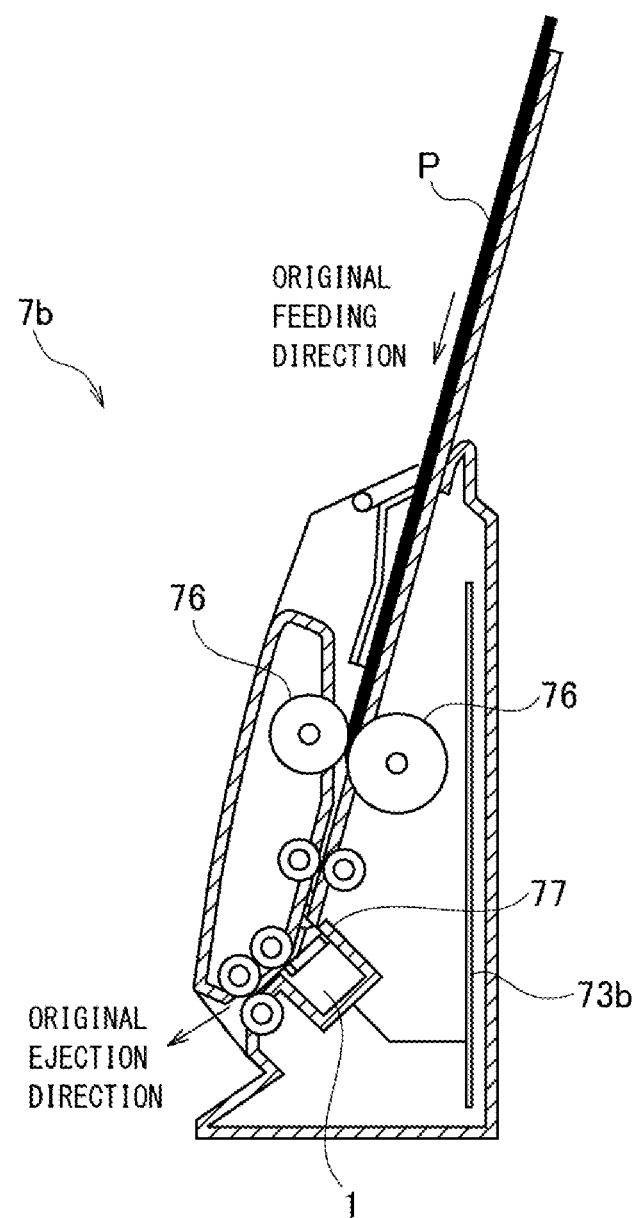
FIG. 14 is an external perspective view of a sheet-feed type image reading apparatus.

FIG. 14 is a cross-sectional schematic view that illustrates the configuration of a sheet-feed type scanner 7b as an image reading apparatus to which the image sensor unit 1 that is an embodiment of the present invention can be applied.

As illustrated in FIG. 14, the scanner 7b includes a housing 71b, the image sensor unit 1, conveyor rollers 76, a circuit board 73b and a cover glass 77.

A driving mechanism that is not illustrated in the drawings causes the conveyor rollers 76 to rotate so as to sandwich the object of illumination P therebetween and convey the object of illumination P. The cover glass 77 is provided so as to cover the upper side of the image sensor unit 1. A control circuit that controls each portion of the scanner 7b including the image sensor unit 1, and a power supply circuit that supplies power to each portion of the scanner 7b and the like are constructed on the circuit board 73b.

The scanner 7b reads the object of illumination P by means of the image sensor unit 1 while conveying the object of illumination P in the reading direction (sub-scan direction) by means of the conveyor rollers 76. That is, the scanner 7b reads the object of illumination P while relatively moving the image sensor unit 1 and the object of illumination P with respect to each other. Note that although an example in which the scanner 7b reads one side of the object of illumination P is illustrated in the drawing, a configuration may also be adopted in which two image sensor units 1 are provided so as to face each other across the conveyance path A of the object of illumination, and which reads both sides of the object of illumination P.

Although the scanners 7a and 7b have been described above with reference to FIG. 13 and FIG. 14 as examples of an image reading apparatus using the image sensor unit 1 to which the present invention can be applied, the configurations or kinds of image reading apparatuses that use the image sensor unit 1 are not limited to the scanners 7a and 7b of the foregoing examples.

(Image Forming Apparatus)

Figure 15:
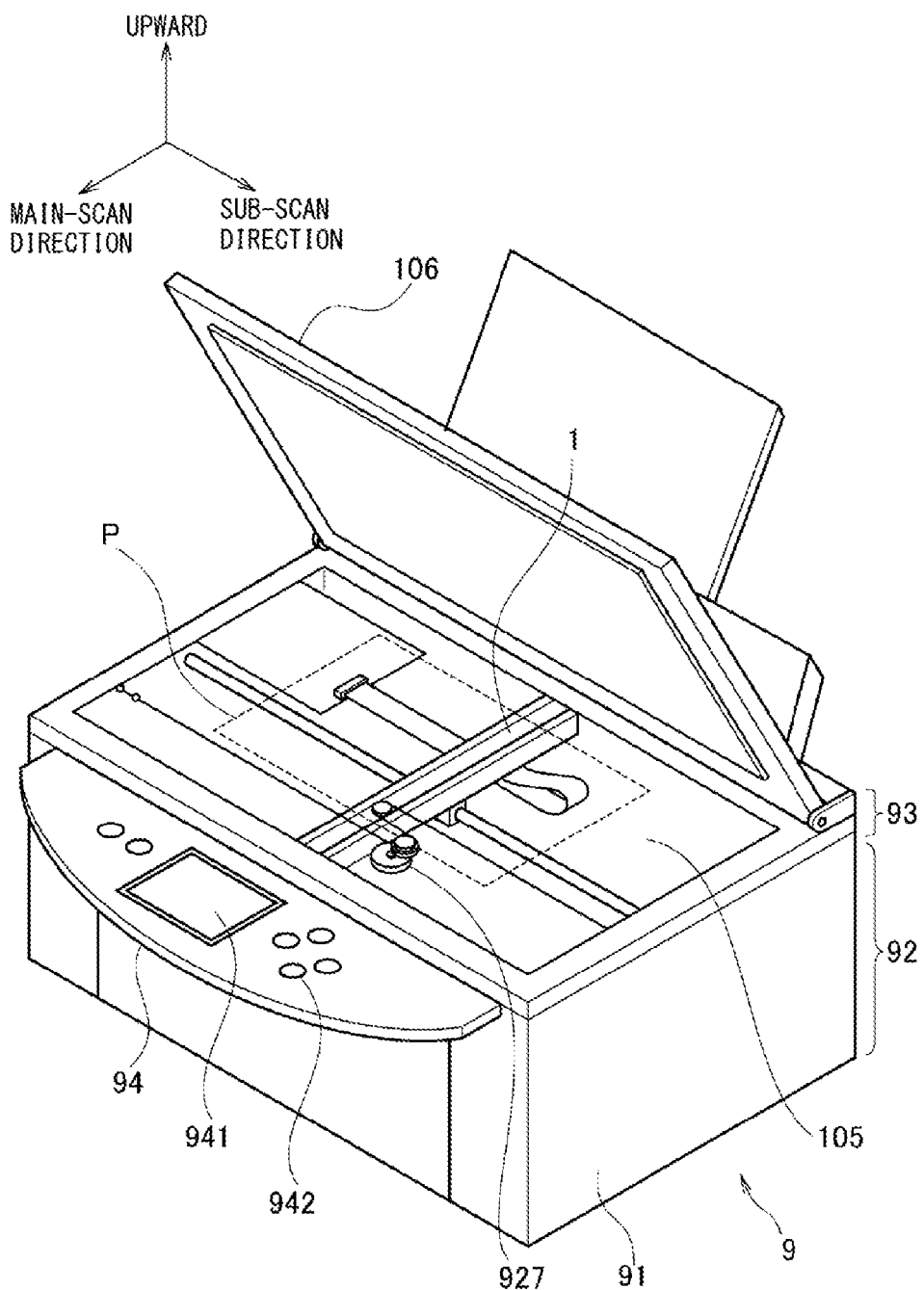
FIG. 15 is an external perspective view of an image forming apparatus.
Figure 16:
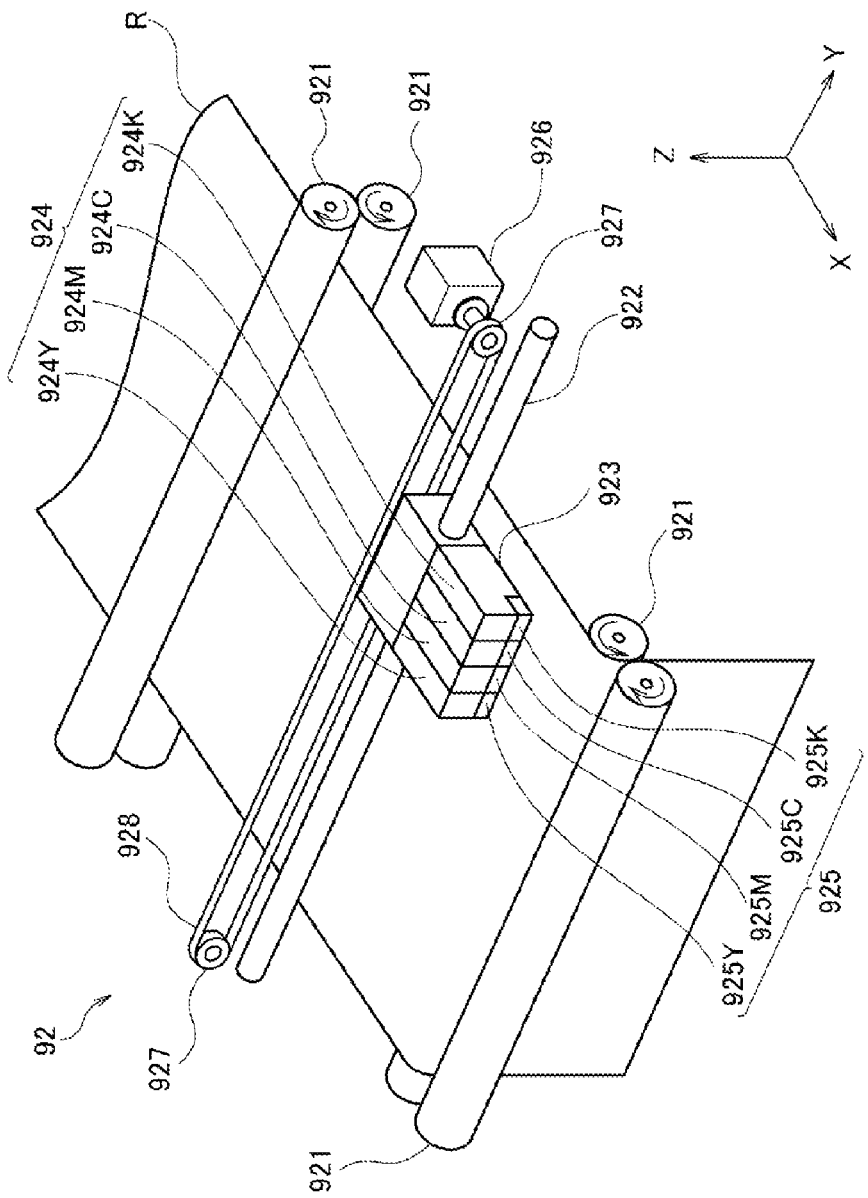
FIG. 16 is a schematic view illustrating essential parts of the internal configuration of the image forming apparatus.

Next, an image forming apparatus 9 that is an embodiment of the present invention is described referring to FIG. 15 and FIG. 16. The image sensor unit 1 that is an embodiment of the present invention is applied to the image forming apparatus 9 that is an embodiment of the present invention. FIG. 15 is an external perspective view of the image forming apparatus 9 that is an embodiment of the present invention. FIG. 16 is a perspective view illustrated by extracting an image forming portion 92 provided in a housing 91 of the image forming apparatus 9 that is an embodiment of the present invention. As illustrated in FIG. 15 and FIG. 16, the image forming apparatus 9 is a compound machine (MFP: multifunction printer) of a flat-bed type scanner and an inkjet printer. The image forming apparatus 9 includes an image reading portion 93 as image reading means that reads an image, and the image forming portion 92 as image forming means that forms an image. The image sensor unit 1 is incorporated into the image reading portion 93 of the image forming apparatus 9. Configurations common to those of the image reading apparatus described above can be applied to the image reading portion 93 of the image forming apparatus 9. Accordingly, a description of the configurations common to those of the image reading apparatus will not be repeated.

As illustrated in FIG. 15, an operation portion 94 is provided in the image forming apparatus 9. The operation portion 94 includes a display portion 941 that displays an operation menu and various messages and the like, and various operation buttons 942 for operating the image forming apparatus 9.

Further, as illustrated in FIG. 16, the image forming portion 92 is provided inside the housing 91 of the image forming apparatus 9. The image forming portion 92 includes conveyor rollers 921, a guide shaft 922, an inkjet cartridge 923, a motor 926 and a pair of timing pulleys 927. The conveyor rollers 921 rotate by means of a driving force of a driving source, and convey a printing paper R as a recording medium in the sub-scan direction. The guide shaft 922 is a rod-shaped member, and is fixed to the housing 91 of the image forming apparatus 9 so that the axis thereof is parallel to the main-scan direction of the printing paper R. The inkjet cartridge 923 can move back and forth in the main-scan direction of the printing paper R by sliding on the guide shaft 922. The inkjet cartridge 923 includes, for example, ink tanks 924 (924C, 924M, 924Y and 924K) that are equipped with cyan C, magenta M, yellow Y and black K ink, and discharge heads 925 (925C, 925M, 925Y and 925K) that are provided in the respective ink tanks 924. One of the pair of timing pulleys 927 is attached to a rotating shaft of the motor 926. The pair of timing pulleys 927 are provided at positions that are separated from each other in the main-scan direction of the printing paper R. A timing belt 928 is wound around the pair of timing pulleys 927 in parallel with the pair of timing pulleys 927, and a predetermined section thereof is coupled to the inkjet cartridge 923.

The image reading portion 93 of the image forming apparatus 9 converts an image read by the image sensor unit 1 to an electric signal in a form that is suitable for printing. The image forming portion 92 of the image forming apparatus 9 drives the conveyor rollers 921, the motor 926 and the inkjet cartridge 923 based on the electric signal converted by the image sensor unit 1 of the image reading portion 93 and forms an image on the printing paper R. In addition, the image forming portion 92 of the image forming apparatus 9 can form an image based on an electric signal input from the outside. The same configurations as those of various well-known printers can be applied to the configurations and operation of the image forming portion 92 in the image forming apparatus 9. Therefore, the details will not be described. Although an inkjet-type image forming apparatus has been described as the image forming portion 92, the type can be any type, such as an electrophotographic type, a thermal transfer type, and a dot impact type.

Although the embodiments of the present invention have been described with reference to the drawings, the present invention is not limited to the embodiments in any sense. Various modifications can be made without departing from the scope of the present invention.

The present invention provides technology that is advantageous for an image sensor unit, a paper sheet distinguishing apparatus, an image reading apparatus and an image forming apparatus. According to the present invention, a difference between deformation amounts caused by temperature variations of a frame and a cover member can be absorbed by a substrate of a double-sided tape changing shape. Accordingly, because a force that causes a double-sided tape to peel off can be decreased, it can be made difficult for the double-sided tape to peel off.

What is claimed is:

1. An image sensor unit that reads light from an object of illumination, comprising:
a light source;
a circuit board on which the light source and a plurality of image sensors are mounted;
a frame in which the light source and the circuit board are housed; and
a cover member that is bonded to the frame;
wherein:
the cover member is bonded by means of a double-sided tape comprising a film-shaped substrate and layers of adhesive formed on two sides of the substrate;
slits that extend from one outer edge in a width direction to an intermediate portion in the width direction and slits that extend from the other outer edge in the width direction to an intermediate portion in the width direction are formed in the double-sided tape; and
the respective slits that are adjacent comprise an overlapping portion when viewed in a long-side direction.

2. The image sensor unit according to claim 1, wherein an interval between the slits decreases as the slits approach the light source with respect to the long-side direction.

3. The image sensor unit according to claim 1, wherein:
a locking portion for positioning is formed in the frame and the cover member; and
an interval between the slits decreases as a distance in the long-side direction from the locking portion increases.

4. The image sensor unit according to claim 1, wherein the slit that extends from one outer edge in the width direction to the intermediate portion in the width direction and the slit that extends from the other outer edge in the width direction to the intermediate portion in the width direction are arranged alternately in the long-side direction.

5. An image sensor unit, comprising:
a frame in which a light source and an image sensor are housed; and
a cover member that is bonded through a double-sided tape to the frame;
wherein:
the double-sided tape comprises a film-shaped substrate and layers of adhesive formed on two sides of the substrate; and
an adhesive layer formed on one side of the substrate and an adhesive layer formed on the other side thereof are formed on opposite sides to each other in a width direction of the substrate, and a portion at which an adhesive layer is not formed on either of the one side and the other side is formed at an intermediate portion in the width direction of the double-sided tape.

6. The image sensor unit according to claim 5, wherein:
a frame-side convex portion that protrudes towards the cover member is formed in the frame; and
an adhesive layer on a side of the frame adheres to a portion that is not the frame-side convex portion and, when viewed from an upper surface, a gap is formed between the adhesive layer and the frame-side convex portion.

7. The image sensor unit according to claim 5, wherein:
a cover-side convex portion that protrudes towards a side of the frame is formed in the cover member; and
an adhesive layer on a side of the cover member adheres to a portion that is not the cover-side convex portion and, when viewed from an upper surface, a gap is formed between the adhesive layer and the cover-side convex portion.

8. A paper sheet distinguishing apparatus, comprising:
an image sensor unit that reads light from a paper sheet, the image sensor unit comprising:
a light source,
a circuit board on which the light source and a plurality of image sensors are mounted,
a frame in which the light source and the circuit board are housed, and
a cover member that is bonded to the frame,
wherein:
the cover member is bonded by means of a double-sided tape comprising a film-shaped substrate and layers of adhesive formed on two sides of the substrate,
slits that extend from one outer edge in a width direction to an intermediate portion in the width direction and slits that extend from the other outer edge in the width direction to an intermediate portion in the width direction are formed in the double-sided tape, and
the respective slits that are adjacent comprise an overlapping portion when viewed in a long-side direction;
image reading portion that reads light from the paper sheet while relatively moving the image sensor unit and the paper sheet with respect to each other; and
distinguishing portion that determines authenticity of the paper sheet.

9. The paper sheet distinguishing apparatus according to claim 8, wherein an interval between the slits decreases as the slits approach the light source with respect to the long-side direction.

10. The paper sheet distinguishing apparatus according to claim 8, wherein:
a locking portion for positioning is formed in the frame and the cover member; and
an interval between the slits decreases as a distance in the long-side direction from the locking portion increases.

11. The paper sheet distinguishing apparatus according to claim 8, wherein the slit that extends from one outer edge in the width direction to the intermediate portion in the width direction and the slit that extends from the other outer edge in the width direction to the intermediate portion in the width direction are arranged alternately in the long-side direction.

* * * * *